(12) United States Patent
Nishihara et al.

(10) Patent No.: US 8,435,619 B2
(45) Date of Patent: May 7, 2013

(54) INFORMATION RECORDING MEDIUM

(75) Inventors: Takashi Nishihara, Osaka (JP); Rie Kojima, Osaka (JP); Akio Tsuchino, Osaka (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 13/060,396

(22) PCT Filed: Feb. 22, 2010

(86) PCT No.: PCT/JP2010/001148
§ 371 (c)(1),
(2), (4) Date: Feb. 23, 2011

(87) PCT Pub. No.: WO2010/095467
PCT Pub. Date: Aug. 26, 2010

(65) Prior Publication Data
US 2011/0151277 A1    Jun. 23, 2011

(30) Foreign Application Priority Data
Feb. 23, 2009  (JP) ................... 2009-038881

(51) Int. Cl.
*G11B 7/241* (2006.01)
(52) U.S. Cl.
USPC ....... 428/64.1; 428/64.4; 428/64.5; 428/64.6; 430/270.13

(58) Field of Classification Search ......... 428/64.5; 430/270.13
See application file for complete search history.

(56) References Cited

U.S. PATENT DOCUMENTS
6,858,278 B2    2/2005  Kojima et al.
6,881,466 B2    4/2005  Kojima et al.

FOREIGN PATENT DOCUMENTS
| | | |
|---|---|---|
| EP | 0 825 595 | 2/1998 |
| JP | 2002-074742 | 3/2002 |
| JP | 2003-341241 | 12/2003 |
| JP | 2004-234817 | 8/2004 |
| JP | 3707797 | 8/2005 |
| JP | 3961411 | 5/2007 |

*Primary Examiner* — Elizabeth Mulvaney
(74) *Attorney, Agent, or Firm* — Hamre, Schumann, Mueller & Larson, P.C.

(57) ABSTRACT

An information recording medium (9) of the present invention is an information recording medium with respect to which information can be recorded or reproduced by irradiation with an optical beam (1). The information recording medium (9) includes a second interface layer (103), a recording layer (104) and a first interface layer (105) in this order from the optical beam (1) incident side. The first interface layer (105) and the second interface layer (103) are disposed in contact with the recording layer (104). The second interface layer (103) contains M1 (where M1 is at least one element selected from Nb, Y, Dy, Ti, Si and Al), Cr and oxygen (O). The first interface layer (105) contains M2 (where M2 is at least one element selected from Nb, Y, Dy, Ti, Si, Al, Zr and Hf), Cr and oxygen (O). The first interface layer (105) and the second interface layer (103) each contain Cr in a range of 50 mol % or less in terms of the oxide ($Cr_2O_3$).

17 Claims, 5 Drawing Sheets

INFORMATION RECORDING MEDIUM

TECHNICAL FIELD

The present invention relates to an information recording medium with respect to which information is optically recorded, erased, rewritten, and/or reproduced.

BACKGROUND ART

As an example of the basic structure of an information recording medium with respect to which information is optically recorded, erased, rewritten, and/or reproduced, there is an embodiment in which a second dielectric layer, a recording layer, a first dielectric layer, and a reflective layer are disposed in this order from the optical beam incident side, for example. Conventionally, $(ZnS)_{80}(SiO_2)_{20}$ (mol %) has been used as a material for the first and second dielectric layers, for example. This material is an amorphous material, and has low thermal conductivity, high transparency and high refractive index. Further, it has high deposition rate in film formation, and has excellent mechanical properties and moisture resistance as well. Thus, this material has been put to practical use as a material suitable for forming dielectric layers.

However, in the case where this material is used for dielectric layers in a rewritable information recording medium, when repeated rewriting is performed by irradiating the recording layer with a laser beam, S in the $(ZnS)_{80}(SiO_2)_{20}$ (mol %) is diffused in the recording layer, thereby causing a significant decrease in the repeated rewriting performance, which is a problem. In order to solve this problem, there has been adopted a structure in which another dielectric layer (interface layer) with a thickness of about 5 nm is additionally provided each between the first dielectric layer and the recording layer, and between the recording layer and the second dielectric layer (see, for example, Patent Literature 1).

For example, Blu-ray disc (hereinafter, abbreviated to BD) media that have been put to practical use as a recording medium for high definition images use a material containing $ZrO_2$—$Cr_2O_3$ (hereinafter, referred to as Zr—Cr—O) for interface layers, and achieve excellent, 10,000 or more times repeated rewriting (see, for example, Patent Literature 2). This material is free from S. It has high melting point and excellent heat resistance, and further has good adhesion to the recording layer. Therefore, it is a material suitable for interface layers. When a BD medium is provided with a plurality of information layers that are referred to as L0, L1, . . . , sequentially from the opposite side of the optical beam incident side, the translucent information layer (L1) located on the optical beam incident side, particularly in a two-layer BD medium with a capacity of 50 gigabytes (GB), has a structure in which very thin layers such as a recording layer with a thickness of about 6 nm and a reflective layer with a thickness of about 10 nm are stacked. In such a structure, the use of interface layers made of Zr—Cr—O has enabled such 10,000 times repeated rewriting performance to be achieved.

CITATION LIST

Patent Literature

Patent Literature 1: JP 3707797 B2
Patent Literature 2: JP 3961411 B2

SUMMARY OF INVENTION

Technical Problem

In recent years, BD became the next generation DVD (Digital Versatile Disc) standard, and thus BD recorders with a built-in high capacity hard disk, and large screen televisions with a built-in BD recorder are marketed, which is now accelerating the adoption of BD recorders and BD media. Under these circumstances, the next challenge of BD media is to increase the capacity thereof. The increase in capacity allows longer recording duration of high definition images on a BD medium, or enables the use of a BD medium as a removable medium instead of a hard disk.

As a method for increasing the capacity, there are a method of increasing the recording capacity per information layer and a method of increasing the number of layers (the number of information layers). A combination of the two methods enables a further increase in capacity. The inventors made efforts to develop a BD medium with a capacity of 100 GB by combining the two methods. Specifically, they developed an information layer with a capacity of 33.4 GB (conventionally 25 GB) per layer and stacked three layers of this information layer as an embodiment. An increase in recording capacity from 25 GB to 33.4 GB means an increase in recording density by 1.34 times, resulting in smaller recording marks themselves. Accordingly, the technical challenge is to obtain signal amplitude from such small recording marks at a level equal to or higher than that from the conventional marks. In order to increase the signal amplitude, it is effective to increase the reflectance ratio $R_c/R_a$ between the amorphous phase (marks) and the crystalline phase (spaces between the marks) in a recording layer (where $R_c$ is the mirror reflectance of a BD medium when the recording layer is in the crystalline phase, and $R_a$ is the mirror reflectance of the BD medium when the recording layer is in the amorphous phase). Further, to increase the number of layers from two to three, the transmittance of the information layer (L2) located closest to the optical beam incident side is required to be increased more than in the case of two layers. The transmittance of L1 has been optically designed to be 50% in the case of two layers, whereas the transmittance of L2 must be optically designed to be not less than 56% in the case of three layers. In order to achieve this, the thickness of the recording layer and the reflective layer, which are layers that absorb the optical beam, of the L2 in the case of three layers may be more reduced than those of L1 in the case of two layers. However, such reduction in thickness causes a decrease in $R_c/R_a$. In such a way, the transmittance and the $R_c/R_a$ are in a trade-off relationship with each other. Accordingly, it is required to achieve an information layer that allows both high transmittance and high reflectance ratio to be obtained in order to increase the capacity. In other words, it is required to develop a layer structure that allows such an information layer to be achieved, specifically, to develop a dielectric material to be used for a layer that is provided in contact with the recording layer.

Furthermore, the information layer is required to have not only the above-mentioned optical properties but also good moisture resistance and repeated rewriting performance, etc. Therefore, the layer to be provided in contact with the recording layer is required to have good adhesion to the recording layer as well.

The present invention has been made to solve the above-mentioned conventional problems. It is an object of the present invention to provide an information layer that allows high transmittance and high reflectance ratio to be obtained and further allows good moisture resistance and repeated rewriting performance to be obtained, thereby providing an information recording medium that can achieve an increase in capacity.

Solution to Problem

The information recording medium of the present invention is an information recording medium with respect to which information can be recorded or reproduced by irradiation with an optical beam. The information recording medium includes a second interface layer, a recording layer, and a first interface layer in this order from the optical beam incident side. The first interface layer and the second interface layer are disposed in contact with the recording layer. The second interface layer contains M1 (where M1 is at least one element selected from Nb, Y, Dy, Ti, Si and Al), Cr and oxygen (O). The first interface layer contains M2 (where M2 is at least one element selected from Nb, Y, Dy, Ti, Si, Al, Zr and Hf), Cr and oxygen (O). The first interface layer and the second interface layer each contain Cr in a range of 50 mol % or less in terms of the oxide ($Cr_2O_3$).

Advantageous Effects of Invention

According to the information recording medium of the present invention, a multilayer rewritable recording medium, for example, with a capacity of 33.4 GB or more per information layer, can be achieved. This allows a high capacity information recording medium with a capacity of 100 GB or more to be achieved.

DESCRIPTION OF EMBODIMENTS

Figure 1:
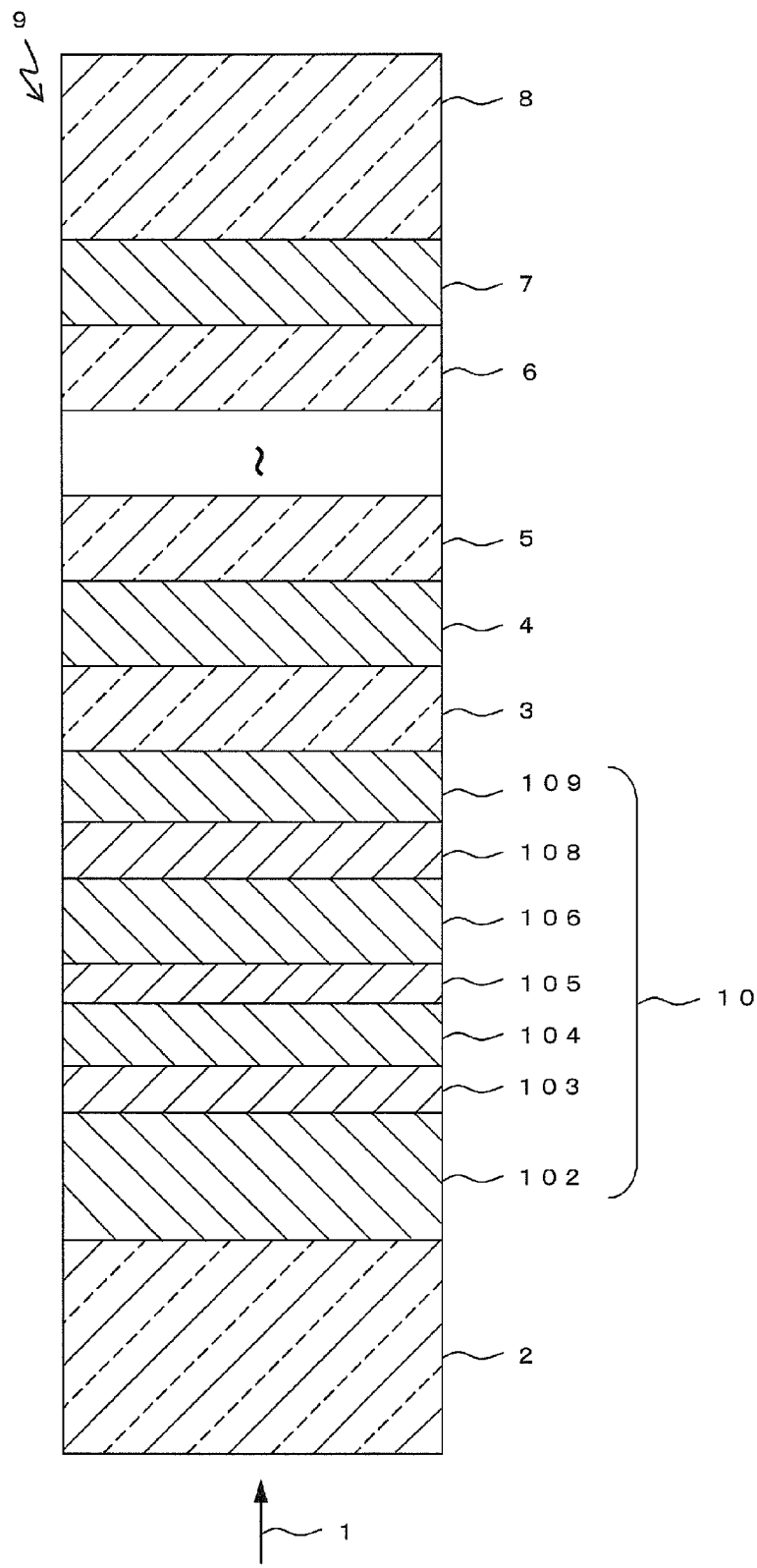
FIG. 1 is a partial sectional view showing an example of the layer structure of an information recording medium of the present invention that includes N information layers.

An object of the information recording medium of the present invention is to provide an information layer that can achieve high transmittance and high reflectance ratio, and further good moisture resistance and repeated rewriting performance as well, thereby providing an information recording medium that can achieve an increase in its capacity.

In order to achieve high transmittance and high reflectance ratio as part of the above-mentioned object, the inventors focused on an information layer (L2) located closest to the optical beam incident side in a three-layer BD medium, and an optical design (calculation) was made for an information layer having a structure in which a second dielectric layer, a second interface layer, a recording layer, a first interface layer, a first dielectric layer, a reflective layer, and a high refractive index layer were disposed in this order from the optical beam incident side. As a result, it has been found that the $R_c/R_a$ can be further increased by adopting a material with higher transparency for the second interface layer and the first interface layer. Actually, a sample of the L2 in which Zr—Cr—O was adopted for the first interface layer and the second interface layer, and a sample of the L2 in which a material with higher transparency was adopted for the first interface layer and the second interface layer were produced to compare the $R_c/R_a$. As a result, the L2 that used the material with higher transparency showed a higher $R_c/R_a$. This result demonstrated that a new transparent interface layer having low extinction coefficient (preferably having an extinction coefficient of less than 0.1) is necessary, for example, as the first interface layer and the second interface layer of the L2.

The interface layers that uses Zr—Cr—O each are an interface layer having excellent moisture resistance and repeated rewriting performance. $ZrO_2$ is a transparent material having thermal stability and $Cr_2O_3$ is a material having excellent adhesion to a chalcogen-based recording layer. However, $Cr_2O_3$ has a high extinction coefficient of about 0.2 for an optical beam at a wavelength of 405 nm, and thus it cannot be used alone in spite of its excellent adhesion. Further, although $ZrO_2$ is a transparent material, it lacks sufficient adhesion to the recording layer. Therefore, some amount of $Cr_2O_3$ is required to be added thereto. A dielectric material that shows excellent adhesion to a chalcogen-based recording layer is very rare. According to experiments by the inventors, examples thereof include SiC, ZnS, Ge—N, $Ga_2O_3$ and $In_2O_3$, other than $Cr_2O_3$. However, SiC has a high extinction coefficient of about 0.3 for an optical beam at a wavelength of 405 nm, which is higher than that of $Cr_2O_3$, and ZnS has the occurrence of diffusion of S, as mentioned above. Further, Ge—N has a decomposition temperature around 700° C., and therefore cannot withstand repeated recordings using a blue-violet laser. $Ga_2O_3$ and $In_2O_3$ have transparency and excellent adhesion. However, they are expensive. Accordingly, it has been concluded that $Cr_2O_3$ is most preferable as a material that can ensure adhesion to the recording layer.

Based on the above-mentioned study, the inventors have arrived at the following structure of the information recording medium of the present invention. In the structure, a second interface layer, a recording layer and a first interface layer are disposed in this order from the optical beam incident side. The first interface layer and the second interface layer each are disposed in contact with the recording layer. The second interface layer contains M1 (where M1 is at least one element selected from Nb, Y, Dy, Ti, Si and Al), Cr and oxygen (O), and the first interface layer contains M2 (where M2 is at least one element selected from Nb, Y, Dy, Ti, Si, Al, Zr and Hf), Cr and oxygen (O). The first interface layer and the second interface layer each contain Cr in a range of 50 mol % or less in terms of the oxide ($Cr_2O_3$).

Hereinafter, embodiments of the present invention are described with reference to the drawings. The following embodiments are an example and the present invention is not limited to the following embodiments. Furthermore, the same parts are indicated with identical numerals and the same descriptions thereof may be omitted in the following embodiments.

Embodiment 1

As Embodiment 1, an example of an information recording medium of the present invention is described. FIG. 1 shows a partial sectional view of an information recording medium 9 of Embodiment 1. The information recording medium 9 is a multilayer information recording medium on/from which information can be recorded/reproduced by irradiation with a laser beam 1 from one side.

The information recording medium 9 is composed of a substrate 8, and N layers (where N is an integer that satisfies N≧2) of information layers including a first information layer 7, . . . , an (N−1)th information layer 4 and an N-th information layer 10 that are sequentially stacked on the substrate 8 with interlayers 6, 5, 3, etc. respectively provided therebetween, and a transparent layer 2. Here, the second information layer (not shown), ..., the (N−1)th information layer 4 and the N-th information layer 10 (hereinafter, the information layer disposed in the K-th number (1≦K≦N) counted from the substrate 8 side is referred to as the "K-th information layer"), which are the second to the N-th information layers counted from the substrate 8 side that is the laser beam 1 incident side, are optically transmissive information layers.

The material for the transparent layer 2 is made of a dielectric, a resin such as a photocurable resin (particularly, an ultraviolet curable resin) and a slow-acting thermosetting resin, or the like, and preferably has low optical absorption with respect to the laser beam 1 to be used and low optical birefringence in a short wavelength region. Acrylic resins are particularly preferable as a material for the transparent layer 2. Further, the transparent layer 2 may be a sheet or a plate in the form of a transparent disc made of glass or a resin such as polycarbonate, amorphous polyolefin and PMMA (polymethylmethacrylate). In this case, the transparent layer 2 can be laminated to the second dielectric layer 102 by an adhesive sheet, a resin such as a photocurable resin (particularly a ultraviolet curable resin) and slow-acting thermosetting resin, or the like. The thickness of the transparent layer 2 is preferably within the range of 0.55 mm to 0.65 mm, for example, in the case of recording/reproduction using an objective lens with NA=0.6. Further, in the case of recording/reproduction using an objective lens with NA=0.85, it is preferably within the range of 50 μm to 120 μm.

The wavelength λ of the laser beam 1 is particularly preferably not more than 450 nm in high density recording. This is because when the laser beam 1 is focused, the spot diameter thereof is determined by the wavelength λ (a shorter wavelength λ enables the laser beam 1 to be focused on a spot with a smaller diameter). Further, when λ is less than 350 nm, optical absorption by the transparent layer 2, etc. is increased. Accordingly, λ is more preferably within the range of 350 nm to 450 nm.

The substrate 8 is a transparent substrate in the form of a disc. As a material for forming the substrate 8, glass or a resin such as polycarbonate, amorphous polyolefin and PMMA can be used, for example. Polycarbonate is particularly useful as a material for the substrate 8 because of its excellent transferability/mass productivity, and its low cost.

Guide grooves for guiding the laser beam 1 may be formed on the surface of the substrate 8 on the side of the first information layer 7, as needed. On the other hand, the surface of the substrate 8 on the opposite side of the first information layer 7 is preferably smooth. The thickness of the substrate 8 is preferably within the range of 0.5 mm to 1.2 mm so that sufficient strength can be ensured and the thickness of the information recording medium 9 should be about 1.2 mm. When the thickness of the transparent layer 2 is about 0.6 mm (which is a thickness that allows good recording/reproduction with NA=0.6), the thickness of the substrate 8 is preferably within the range of 0.55 mm to 0.65 mm. Further, when the thickness of the transparent layer 2 is about 0.1 mm (which is a thickness that allows good recording/reproduction with NA=0.85), the thickness of the substrate 8 is preferably within the range of 1.05 mm to 1.15 mm.

The interlayers 6, 5, 3, etc. each are made of a dielectric, a resin such as a photocurable resin (particularly, an ultraviolet curable resin) and a slow-acting thermosetting resin, or the like. The interlayers 6, 5, 3, etc. preferably have low optical absorption with respect to the laser beam 1 to be used and low optical birefringence in a short wavelength region. As a material for the interlayers 6, 5, 3, etc., acrylic resins are particularly preferable.

The interlayers 6, 5, 3, etc. are provided for separating the respective focal positions on the N-th information layer 10, the (N−1)th information layer 4, ... and the first information layer 7 from each other in the information recording medium 9. The thickness of the interlayers 6, 5, 3, etc. is required to be at least the focal depth $\Delta Z$ that is determined by the numerical aperture NA of the objective lens and the wavelength λ of the laser beam 1. Assuming that the reference of the intensity at a focal point is 80% of the aberration-free intensity, $\Delta Z$ can be approximated by $\Delta Z = \lambda / \{2(NA)^2\}$. In the case of λ=405 nm and NA=0.85, $\Delta Z$=0.280 μm is given, and ±0.3 μm is within the focal depth. Therefore, in this case, the thickness of the interlayers 6, 5, 3, etc. is required to be at least 0.6 μm.

It is desirable that the distance between adjacent two information layers, and the distance between the N-th information layer 10 and the first information layer 7 that is farthest therefrom be adjusted within a range that allow the laser beam 1 to be focused by an objective lens. Accordingly, the total of the thickness of the interlayers 6, 5, 3, etc. is preferably within the tolerance (for example, 60 μm or less) of the objective lens.

Guide grooves for guiding the laser beam 1 may be formed, as needed, on the surfaces of the interlayers 6, 5, 3, etc. on the laser beam 1 incident side.

In this case, recording/reproduction of information on/from the K-th information layer (where K is an integer of 1≦K<N) can be performed only by irradiation with the laser beam 1 from one side, using the laser beam 1 that has been transmitted through the N-th to the (K+1)th information layers.

It should be noted that any one of the layers from the first information layer to the N-th information layer may be a read-only information layer (ROM (Read Only Memory)), or may be a write-once recordable information layer (R (Recordable)).

Hereinafter, the configuration of the N-th information layer 10 is described in detail. In this embodiment, the N-th information layer 10 corresponds to an information layer with a feature configuration of the present invention, that is, the L-th information layer in the information recording medium of the present invention.

The N-th information layer 10 includes the second dielectric layer 102, a second interface layer 103, a recording layer 104, a first interface layer 105, a first dielectric layer 106, a reflective layer 108 and a transmittance adjusting layer 109 that are disposed in this order from the laser beam 1 incident side. The second dielectric layer 102 and/or the first dielectric layer 106 may be omitted, as needed.

The second dielectric layer 102 is made of a dielectric. This second dielectric layer 102 has a function of preventing oxidation, corrosion, deformation and the like of the recording layer 104, a function of adjusting an optical distance to increase the optical absorptance of the recording layer 104, and a function of increasing the change in the amount of reflected light between before and after recording to increase the signal intensity.

Examples of the material for forming the second dielectric layer 102 include one or a plurality of oxides selected from $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$ and $TeO_2$. Further, one or a plurality of nitrides selected from C—N, Ti—N, Zr—N, Nb—N, Ta—N, Si—N, Ge—N, Cr—N, Al—N, Ge—Si—N, Ge—Cr—N, etc. also can be used therefor. Further, sulfides such as ZnS, carbides such as SiC, fluorides such as $LaF_3$ and $CeF_3$, and C also can be used as a material for the second dielectric layer 102. Further, a mixture containing one or a plurality of materials selected from the above-mentioned materials also can be used to form the second dielectric layer 102. For example, $ZnS$—$SiO_2$ that is a mixture of ZnS and $SiO_2$ is particularly excellent as a material for the second dielectric layer 102. This is because $ZnS$—$SiO_2$ is an amorphous material and has high refractive index and deposition rate, and good mechanical strength and moisture resistance.

The thickness of the second dielectric layer 102 can be precisely determined by calculation based on a matrix method so as to satisfy the conditions that increase the change in the amount of reflected light between the state where the recording layer 104 is in the crystalline phase and the state where it is in the amorphous phase, the optical absorptance of the recording layer 104 and the transmittance of the N-th information layer 10. The thickness of the second dielectric layer 102 is desirably within the range of 20 nm to 50 nm, more preferably within the range of 30 nm to 40 nm.

The second interface layer 103 that is an essential component of the information recording medium of the present invention has a function of preventing the mass transfer that occurs between the second dielectric layer 102 and the recording layer 104 due to repeated recordings. Further, the second interface layer 103 has a function of adjusting the crystallizability of the recording layer 104, that is, accelerating or suppressing crystallization as well. The second interface layer 103 is preferably made of a material that has a high melting point so as not to melt in recording and low optical absorption, and that has good adhesion to the recording layer 104. Being a material that has a high melting point so as not to melt in recording is a necessary property to avoid the incorporation of the material of the second interface layer 103 into the recording layer 104 due to melting, in the irradiation with the laser beam 1 at high power. The incorporation of the material of the second interface layer 103 causes the composition of the recording layer 104 to change, thus resulting in a significant decrease in the rewriting performance. Further, being a material that has good adhesion to the recording layer 104 is a necessary property to ensure reliability.

The second interface layer 103 contains M1 (where M1 is at least one element selected from Nb, Y, Dy, Ti, Si and Al, which can be applied to M1 shown below in this description), Cr and oxygen (O). The use of a material containing M1, Cr and O allows the second interface layer 103 to have both excellent adhesion to the recording layer 104 and high transparency. It should be noted that the second interface layer 103 may merely contain M1, Cr and O, but it preferably contains M1, Cr and O as its main components. In order to further ensure the effects of the present invention, the second interface layer 103 may consist essentially of M1, Cr and O. In this description, the expression that the second interface layer 103 contains M1, Cr and O as its main components means that, when the total of all the atoms contained in the second interface layer 103 is taken as 100 atom %, the total of the atoms of M1, Cr and O is at least 80 atom %, preferably at least 90 atom %. Further, even in the case of the second interface layer 103 consisting essentially of M1, Cr and O, a slight amount (for example, not more than 5 atom %) of elements other than these (for example, Sn) may be mixedly contained therein.

Materials containing Cr and O are preferable for further accelerating crystallization of the recording layer 104. Among these materials, an oxide in which Cr and O form $Cr_2O_3$ is preferable. $Cr_2O_3$ is a material that has good adhesion to the recording layer 104. Further, materials containing M1 and O are preferable because such materials can enhance the transparency of the second interface layer 103. Among these materials, oxides in which M1 and O form $Nb_2O_5$, $Y_2O_3$, $Dy_2O_3$, $TiO_2$, $SiO_2$ and $Al_2O_3$ are preferable. $Nb_2O_5$, $Y_2O_3$, $Dy_2O_3$, $TiO_2$, $SiO_2$ and $Al_2O_3$ each are a material that has high transparency. Further, the above-mentioned oxides may be mixed. Particularly, aluminum titanate ($Al_2TiO_5$) containing $TiO_2$ and $Al_2O_3$ at a ratio of 1:1 is a complex oxide, has a melting point of 1860° C., which means to be thermally stable, and can enhance the refractive index with respect to an optical beam at the wavelength of the laser beam 1. Therefore, it is preferable as a material for the second interface layer 103. The second interface layer 103 may contain a suboxide (an oxide that contains less oxygen than the stoichiometric composition) or a mixture other than the above-mentioned compounds and complex oxide.

The second interface layer 103 may contain a material expressed by the following formula (1):

$$M1_a Cr_b O_{100-a-b} (\text{atom \%}) \quad (1),$$

(where a and b satisfy $12 < a < 40$, $0 < b \leq 25$, and $25 < (a+b) \leq 40$). The second interface layer 103 may consist essentially of this material. The expression of consisting essentially of a material expressed by $M1_a Cr_b O_{100-a-b}$ (atom %) means that the total of the atoms of M1, Cr and O contained in the second interface layer 103 is at least 95 atom %, preferably at least 98 atom %.

Further, the second interface layer 103 may contain a material expressed by the following formula (3):

$$(D1)_e (Cr_2O_3)_{100-e} (\text{mol \%}) \quad (3),$$

(where D1 is at least one oxide selected from $Nb_2O_5$, $Y_2O_3$, $Dy_2O_3$, $TiO_2$, $SiO_2$ and $Al_2O_3$, and e satisfies $50 \leq e < 100$). The second interface layer 103 may consist essentially of this material. The expression of consisting essentially of a material expressed by $(D1)_e (Cr_2O_3)_{100-e}$ (mol %) means that the total of the oxides $Cr_2O_3$ and D1 contained in the second interface layer 103 is at least 95 mol %, preferably at least 98 mol %. When such materials are contained, the second interface layer 103 having both excellent adhesion to the recording layer 104 and high transparency can be provided, thus allowing the N-th information layer 10 having high reflectance ratio and high transmittance in combination to be provided using this second interface layer 103.

However, the amount of Cr to be contained in the second interface layer 103 is set to a value not more than 50 mol % in terms of the oxide ($Cr_2O_3$). When the amount of Cr contained in the second interface layer 103 exceeds the value, the transparency of the second interface layer 103 decreases. Thus, the amount of Cr is set to such a value.

In this description, the expression "$M1_a Cr_b O_{100-a-b}$ (atom %)" means to be a composition formula that is expressed by taking the total number of "M1" atoms, "Cr" atoms and "O" atoms as a reference (100 atom %). Furthermore, the expression "$(D1)_e (Cr_2O_3)_{100-e}$ (mol %)" means to be a mixture of e mol % of the compound D1 and 100-e mol % of $Cr_2O_3$. Hereinafter, the same expressions are used with the same meaning.

In the case where the second interface layer 103 contains an oxide in which Cr and O form $Cr_2O_3$, the content of $Cr_2O_3$ in the second interface layer 103 is more preferably at least 10 mol % in order to ensure the adhesion to the recording layer 104. Furthermore, the content of $Cr_2O_3$ in the second interface layer 103 is more preferably not more than 30 mol % in order to keep the transparency of the second interface layer 103 high. An excessive content of $Cr_2O_3$ causes an increase in optical absorption, which tends to decrease the transparency, as described above.

The thickness of the second interface layer 103 is desirably within the range of 0.5 nm to 50 nm, more preferably within the range of 1 nm to 15 nm, so as to prevent the change in the amount of reflected light between before and after recording on the N-th information layer 10 from decreasing due to the optical absorption by the second interface layer 103.

The recording layer 104 is made of a material in which a phase change occurs between the crystalline phase and the amorphous phase due to irradiation with the laser beam 1. In the information recording medium 9 of this embodiment, the recording layer 104 may contain Ge—Te, and the content of Ge may be 40 atom % or more. In this case, examples of the material for the recording layer 104 include a material containing any one selected from GeTe, (Ge—Sn) Te, GeTe—$Sb_2Te_3$, (Ge—Sn) Te—$Sb_2Te_3$, GeTe—$Bi_2Te_3$, (Ge—Sn) Te—$Bi_2Te_3$, GeTe—$(Sb—Bi)_2Te_3$, (Ge—Sn) Te—$(Sb—Bi)_2$ $Te_3$, GeTe—$(Bi—In)_2Te_3$ and (Ge—Sn)Te—$(Bi—In)_2$ $Te_3$. Further, the recording layer 104 may contain at least one material selected from Sb—Ge and Sb—Te, and the content of Sb may be 70 atom % or more. In this case, a material containing any one selected from (Sb—Te)—Ga, Sb—Ge, (Sb—Te)—Ge, (Sb—Te)—In, Sb—Mn—Ge, Sb—Sn—Ge, Sb—Mn—Sn—Ge and (Sb—Te)—Ag—In also can be used.

The N-th information layer 10 is required to have high transmittance in order to allow a necessary amount of the laser beam for recording/reproduction to reach the information layers located farther than the N-th information layer 10 from the laser beam 1 incident side. For this reason, the thickness of the recording layer 104 is preferably not more than 9 nm, more preferably not more than 8 nm.

Further, it also is possible to form the recording layer 104 as a recording body by stacking at least two layers selected from a layer containing Te, a layer containing Bi, a layer containing Ge, a layer containing Sb, a layer containing Ge—Te, a layer containing Sb—Ge, etc. For example, when a structure obtained by stacking a layer containing Bi with comparatively high crystallization rate and a layer containing Ge—Te with comparatively stable amorphous phase is included therein, it is possible to adjust the recording sensitivity and the erasing performance of a phase-change information recording medium easily. In this description, a material expressed by "(Element A)-(Element B)" is a material containing Element A and Element B as its components, which means a mixture or an alloy of Element A and Element B.

Examples of such stacked layer structure include $Bi_2Te_3$ (3 nm)/GeTe (4 nm), $(Bi—In)_2Te_3$ (3 nm)/(GeSn) Te (4 nm), GeTe—$Bi_2Te_3$ (5 nm)/(GeSn) Te (2 nm), Sb—Ge (4 nm)/Sb—Te (3 nm), etc. Of course, it also is possible to use a layer made of materials other than the materials described herein or employ a structure in which layers have a thickness different from the thickness exemplified herein or a structure in which the stacking order is changed. For example, the thickness exemplified above may be considered as a preferable thickness ratio, and may be multiplied, for example, by a value of 2 to 4, corresponding to the desired thickness of the recording body.

Further, the recording layer 104 may be formed using a material in which an irreversible phase change occurs. For example, it also is possible to form the recording layer 104 using a material expressed by Te—O, Te—Pd—O, Bi—O or Sb—O. In this case, the thickness of the recording layer 104 is preferably not more than 30 nm.

Further, the recording layer 104 may be stacked films (for example, with a Cu/Si stacked structure) of materials in which an irreversible alloying occurs.

The first interface layer 105 that is an essential component of the information recording medium of the present invention has a function of preventing the mass transfer that occurs between the first dielectric layer 106 and the recording layer 104 due to repeated recordings. Further, the first interface layer 105 has a function of adjusting the crystallizability of the recording layer 104, that is, accelerating or suppressing crystallization as well. The first interface layer 105 is preferably made of a material that has a high melting point so as not to melt in recording and low optical absorption, and that has good adhesion to the recording layer 104. Being a material that has a high melting point so as not to melt in recording is a necessary property to avoid incorporation into the recording layer 104 due to melting, in the irradiation with the laser beam 1 at high power. The incorporation of the material of the first interface layer 105 causes the composition of the recording layer 104 to change, thus resulting in a significant decrease in the rewriting performance. Further, being a material that has good adhesion to the recording layer 104 is a necessary property to ensure reliability.

The first interface layer 105 contains M2 (where M2 is at least one element selected from Nb, Y, Dy, Ti, Si, Al, Zr and Hf, which can be applied to M2 shown below in this description), Cr and oxygen (O). The use of a material containing M2, Cr and O allows the first interface layer 105 to have both excellent adhesion to the recording layer 104 and high transparency. It should be noted that the first interface layer 105 may merely contain M2, Cr and O, but it preferably contains M2, Cr and O as its main components. In order to ensure the effects of the present invention further, the first interface layer 105 may consist essentially of M2, Cr and O. In this description, the expression that the first interface layer 105 contains M2, Cr and O as its main components means that, when the total of all the atoms contained in the first interface layer 105 is taken as 100 atom %, the total of the atoms of M2, Cr and O is at least 80 atom %, preferably at least 90 atom %. Further, even in the case of the first interface layer 105 consisting essentially of M2, Cr and O, a slight amount (for example, not more than 5 atom %) of elements other than these (for example, Sn) may be mixedly contained therein.

Materials containing Cr and O are preferable for further accelerating crystallization of the recording layer 104. Among these materials, an oxide in which Cr and O form $Cr_2O_3$ is preferable. Further, materials containing M2 and O are preferable because such materials can enhance the transparency of the first interface layer 105. Among these materials, oxides in which M2 and O form $Nb_2O_5$, $Y_2O_3$, $Dy_2O_3$, $TiO_2$, $SiO_2$, $Al_2O_3$, $ZrO_2$ and $HfO_2$ are preferable. $Nb_2O_5$, $Y_2O_3$, $Dy_2O_3$, $TiO_2$, $SiO_2$, $Al_2O_3$, $ZrO_2$ and $HfO_2$ each are a material that has high transparency. Further, the above-mentioned oxides may be mixed. Particularly, mullite ($Al_6Si_2O_{13}$) containing $SiO_2$ and $Al_2O_3$ at a ratio of 2:3 is a complex oxide, has a melting point of 1850° C., which means to be thermally stable, and further can decrease the refractive index. Therefore, it is preferable as a material for the first interface layer 105. The first interface layer 105 may contain a suboxide (an oxide that contains less oxygen than the stoichiometric composition) or a mixture other than the above-mentioned compounds and complex oxide.

The first interface layer 105 may contain a material expressed by the following formula (2):

$$M2_cCr_dO_{100-c-d}(\text{atom \%}) \qquad (2),$$

(where c and d satisfy 12<c<40, 0<d≦25, and 25<(c+d)≦40). The first interface layer 105 may consist essentially of this material. The expression of consisting essentially of a material expressed by $M2_cCr_dO_{100-c-d}$ (atom %) means that the total of the atoms of M2, Cr and O contained in the first interface layer 105 is at least 95 atom %, preferably at least 98 atom %.

Further, the first interface layer 105 may contain a material expressed by the following formula (4):

$$(D2)_f(Cr_2O_3)_{100-f} (\text{mol \%}) \tag{4}$$

(where D2 is at least one oxide selected from $Nb_2O_5$, $Y_2O_3$, $Dy_2O_3$, $TiO_2$, $SiO_2$, $Al_2O_3$, $ZrO_2$ and $HfO_2$, and (satisfies $50 \leq f < 100$). The first interface layer 105 may consist essentially of this material. The expression of consisting essentially of a material expressed by $(D2)f(Cr_2O_3)_{100-f}$ (mol %) means that the total of the oxides $Cr_2O_3$ and D2 contained in the first interface layer 105 is at least 95 mol %, preferably at least 98 mol %. When such materials are contained, the first interface layer 105 having both excellent adhesion to the recording layer 104 and high transparency can be provided, thus allowing the N-th information layer 10 having high reflectance ratio and high transmittance in combination to be provided using the first interface layer 105.

However, the amount of Cr to be contained in the first interface layer 105 is set to a value not more than 50 mol % in terms of the oxide ($Cr_2O_3$). When the amount of Cr contained in the first interface layer 105 exceeds the value, the transparency of the first interface layer 105 decreases. Thus, the amount of Cr is set to such a value.

In the case where the first interface layer 105 contains an oxide in which Cr and O form $Cr_2O_3$, the content of $Cr_2O_3$ in the first interface layer 105 is more preferably at least 10 mol % in order to ensure the adhesion to the recording layer 104. Furthermore, the content of $Cr_2O_3$ in the first interface layer 105 is more preferably not more than 30 mol % in order to keep the transparency of the first interface layer 105 high. An excessive content of $Cr_2O_3$ causes an increase in optical absorption, which tends to decrease the transparency, as described above.

The thickness of the first interface layer 105 is desirably within the range of 0.5 nm to 30 nm, more preferably within the range of 1 nm to 10 nm, so as to prevent the change in the amount of reflected light between before and after recording on the N-th information layer 10 from decreasing due to the optical absorption by the first interface layer 105.

Here, when the refractive index of the second interface layer 103 is referred to as n2 and the refractive index of the first interface layer 105 is referred to as n1, with respect to the laser beam 1 at the wavelength λ, the relationship of n1<n2 is preferably satisfied in order to allow the N-th information layer 10 to have both high reflectance ratio and high transmittance. $Nb_2O_5$, $Y_2O_3$, $Dy_2O_3$ and $TiO_2$ each are a material that has comparatively high refractive index. Therefore, it is preferable that the content of these materials in the second interface layer 103 be high. Further, $SiO_2$ and $Al_2O_3$ each are a material that has comparatively low refractive index. Therefore, it is preferable that the content of these materials in the first interface layer 105 be higher. The difference between the refractive index n1 of the first interface layer 105 and the refractive index n2 of the second interface layer 103 is preferably significant, for example, falling within the range of 0.2 to 0.5.

Furthermore, Cr contained in the second interface layer 103 and/or the first interface layer 105 may be partially substituted by at least one element selected from Ga and In. In the case where Cr is contained in the state of the oxide $Cr_2O_3$, $Cr_2O_3$ contained in the second interface layer 103 and/or the first interface layer 105 may be partially substituted by at least one oxide selected from $Ga_2O_3$ and $In_2O_3$. The reason for this is that $Ga_2O_3$ and $In_2O_3$ each are a material that has good adhesion to the recording layer 104. An excessive content of the substitution element (Ga, In) might cause a decrease in adhesion to the recording layer 104, and thus the amount of the substitution element is preferably not more than the amount of Cr.

The first dielectric layer 106 has a function of adjusting an optical distance to increase the optical absorptance of the recording layer 104, and a function of increasing the change in the amount of reflected light between before and after recording to increase the signal intensity. The first dielectric layer 106 can be formed using the same type of material as that for the second dielectric layer 102. Further, the thickness of the first dielectric layer 106 is preferably within the range of 0.5 nm to 30 nm, more preferably within the range of 1 nm to 20 nm. When the thickness of the first dielectric layer 106 is selected from this range, heat generated in the recording layer 104 can be diffused effectively toward the reflective layer 108.

The reflective layer 108 has an optical function of increasing the amount of light to be absorbed by the recording layer 104. Further, the reflective layer 108 also has a thermal function of diffusing the heat generated in the recording layer 104 rapidly so as to allow the recording layer 104 to become amorphous easily. Moreover, the reflective film 108 has a function of protecting the multilayer film from the use environment as well.

Examples of the material to be used for the reflective film 108 include single metals with high thermal conductivity, such as Ag, Au, Cu and Al. Further, alloys such as Al—Cr, Al—Ti, Al—Ni, Al—Cu, Au—Pd, Au—Cr, Ag—Cu, Ag—Pd, Ag—Pd—Cu, Ag—Pd—Ti, Ag—Ru—Au, Ag—Cu—Ni, Ag—Zn—Al, Ag—Nd—Au, Ag—Nd—Cu, Ag—Bi, Ag—Ga, Ag—Ga—In, Ag—Ga—Cu, Ag—In, Ag—In—Sn, and Cu—Si also can be used therefor. Particularly, Ag alloys containing at least 50 atom % of Ag are preferable as a material for the reflective layer 108 because of their high thermal conductivity. The thickness of the reflective layer 108 is preferably not more than 15 nm, more preferably not more than 10 nm, in order to increase the transmittance of the N-th information layer 10 as much as possible. When the thickness of the reflective layer 108 is within this range, it has a sufficient heat diffusion function, the reflectance of the N-th information layer 10 can be ensured, and the transmittance of the N-th information layer 10 is sufficient.

The transmittance adjusting layer 109 is made of a dielectric, and has a function of adjusting the transmittance of the N-th information layer 10. This transmittance adjusting layer 109 enables both the transmittance $T_c$ (%) of the N-th information layer 10 when the recording layer 104 is in the crystalline phase and the transmittance $T_a$ (%) of the N-th information layer 10 when the recording layer 104 is in the amorphous phase to be increased. Specifically, the transmittance of the N-th information layer 10 that includes the transmittance adjusting layer 109 is raised by about 2% to 10% as compared to the case without the transmittance adjusting layer 109. Further, the transmittance adjusting layer 109 has a function of effectively diffusing heat generated in the recording layer 104.

Examples of the material to be used for the transmittance adjusting layer 109 include oxides such as $TiO_2$, $ZrO_2$, $HfO_2$, ZnO, $Nb_2O_5$, $Ta_2O_5$, $SiO_2$, $Al_2O_3$, $Bi_2O_3$, $CeO_2$, $WO_3$, $Cr_2O_3$, $Ga_2O_3$ and Sr—O. Further, nitrides such as Ti—N, Zr—N, Nb—N, Ta—N, Si—N, Ge—N, Cr—N, Al—N, Ge—Si—N and Ge—Cr—N also can be used therefor. Further, sulfides such as ZnS also can be used. Further, a mixture of the above-mentioned materials also can be used. Among these, $TiO_2$ or a material containing $TiO_2$ is particularly preferable for use. These materials have high refractive index (refractive index n=2.6 to 2.8) and low extinction coefficient (extinction coefficient k=0.0 to 0.05). Therefore, the function of increasing the transmittance of the N-th information layer 10 can be enhanced.

The refractive index $n_t$ and the extinction coefficient $k_t$ of the transmittance adjusting layer 109 with respect to the laser beam 1 at the wavelength λ preferably satisfy $2.0 \leq n_t$ and $k_t \leq 0.1$, more preferably satisfy $2.4 \leq n_t \leq 3.0$ and $k_t \leq 0.05$, in order to further enhance the function of increasing the transmittances $T_c$ and $T_a$ of the N-th information layer 10.

The thickness d1 of the transmittance adjusting layer 109 is preferably within the range of $(3/32) \lambda/n_t \leq d1 \leq (5/32)\lambda/n_t$. When the wavelength λ of the laser beam 1 and the refractive index $n_t$ of the transmittance adjusting layer 109 are selected so as to satisfy, for example, 350 nm$\leq \lambda \leq$450 nm and $2.0 \leq n_t \leq 3.0$, respectively, d1 is preferably in the range of 9 nm$\leq$d1$\leq$30 nm. It is possible to enhance both the transmittances $T_c$ and $T_a$ of the N-th information layer 10 by selecting d1 within this range.

The transmittances $T_c$ and $T_a$ of the N-th information layer 10 preferably satisfy $45 \leq T_c$ and $45 \leq T_a$, more preferably satisfy $50 \leq T_c$ and $50 \leq T_a$, in order to allow a necessary amount of the laser beam for recording/reproduction to reach the information layers located farther than the N-th information layer 10 from the laser beam 1 incident side.

The transmittances $T_c$ and $T_a$ of the N-th information layer 10 preferably satisfy $-5 \leq (T_c-T_a) \leq 5$, more preferably satisfy $-3 \leq (T_c-T_a) \leq 3$. When $T_c$ and $T_a$ satisfy these conditions, the change in the transmittance of the N-th information layer 10 according to the state of the recording layer 104 has less influence in recording/reproduction with respect to the information layers located farther than the N-th information layer 10 from the laser beam 1 incident side. Thus, good recording/reproduction properties can be obtained.

In the N-th information layer 10, the reflectance $R_c$ (%) with respect to the laser beam 1 when the recording layer 104 is in the crystalline phase and the reflectance $R_a$ (%) with respect to the laser beam 1 when the recording layer 104 is in the amorphous phase preferably satisfy $R_a<R_c$. This allows high reflectance to be achieved in the initial state in which no information is recorded, and recording/reproduction operations to be stably performed. Further, $R_c$ and $R_a$ preferably satisfy $0.1 \leq R_a \leq 1$ and $1.5 \leq R_c \leq 5$, more preferably satisfy $0.1 \leq R_a \leq 0.7$ and $1.5 \leq R_c \leq 3$, in order to increase the reflectance difference ($R_c-R_a$) so that good recording/reproduction properties can be obtained.

The information recording medium 9 can be produced by the method described below.

First, (N−1) information layers (from the first information layer 7 to the (N−1)th information layer 4) are sequentially stacked on the substrate 8 (with a thickness, for example, of 1.1 mm) with interlayers (the interlayers 6, 5, etc.) respectively provided therebetween. Each information layer is formed of a single layer film, or a multilayer film. The layers that compose each information layer can be formed by sequential sputtering of sputtering targets to serve as materials in a film forming apparatus. Further, each interlayer can be formed by applying a resin such as a photocurable resin (particularly, an acrylic ultraviolet curable resin) and a slow-acting thermosetting resin onto the information layer, and thereafter rotating the substrate 8 so that the resin is uniformly spread (spin coating), followed by curing the resin. In the case where the interlayer is to be provided with guide grooves for the laser beam 1, such guide grooves can be formed on the interlayer by bringing a substrate (mold) formed with grooves into close contact with the resin before curing, thereafter rotating the substrate 8 and the mold covering the substrate 8 (the substrate (mold) that has been brought into close contact with the substrate 8) for spin coating, followed by curing the resin, and then separating the substrate (mold) therefrom. Not only the above-mentioned spin coating, but also printing techniques such as screen printing and ink jetting can be used as the method for forming an interlayer, in application to the microfabrication technology.

In this way, after (N−1) information layers are stacked on the substrate 8 with respective interlayers provided therebetween, an interlayer 3 (with a thickness, for example, of 10 μm) is further formed thereon.

Subsequently, the N-th information layer 10 is formed on the interlayer 3. Specifically, the substrate 8 on which the (N−1) information layers have been stacked with respective interlayers provided therebetween and the interlayer 3 has been formed further thereon is placed in the film forming apparatus. Thereafter, the transmittance adjusting layer 109 is formed on the interlayer 3. The transmittance adjusting layer 109 can be formed by sputtering a sputtering target made of a dielectric that constitutes the transmittance adjusting layer 109 in a rare gas atmosphere or in an atmosphere of a mixed gas of a rare gas and a reactive gas (particularly, $O_2$ gas), using a high frequency (RF) power source. In order to enhance the deposition rate, a direct current (DC) power source or a pulsed DC power source also can be used for sputtering by adding a slight amount of an electrically conductive material to the material that constitutes the transmittance adjusting layer 109 so as to give electrical conductivity to the sputtering target. Further, the transmittance adjusting layer 109 can be formed also by reactive sputtering of a sputtering target made of a metal that constitutes the transmittance adjusting layer 109 in an atmosphere of a mixed gas of a rare gas and a reactive gas, using a DC power source, a pulsed DC power source, or an RF power source.

Alternatively, the transmittance adjusting layer 109 can be formed also by simultaneous sputtering of respective sputtering targets of single dielectrics, using a plurality of power sources. Further, the transmittance adjusting layer 109 can be formed also by simultaneous sputtering of binary sputtering targets, ternary sputtering targets, or the like, in which at least two dielectrics are combined, using a plurality of power sources. Also in the case of using such a sputtering target, sputtering can be performed in a rare gas atmosphere or in an atmosphere of a mixed gas of a rare gas and a reactive gas (particularly, $O_2$ gas).

Subsequently, the reflective layer 108 is formed on the transmittance adjusting layer 109. The reflective layer 108 is formed by sputtering of a sputtering target made of a metal or an alloy that constitutes the reflective layer 108 in an atmosphere of a rare gas (for example, Ar gas) or in an atmosphere of a mixed gas of a rare gas and a reactive gas (for example, at least one selected from $O_2$ gas and $N_2$ gas), using a DC power source, a pulsed DC power source, or an RF power source. Since the reflective layer 108 is a metal or an alloy, a DC power source or a pulsed DC power source that can enhance the deposition rate is preferably used for sputtering.

Subsequently, the first dielectric layer 106 is formed on the reflective layer 108, as needed. The first dielectric layer 106 can be formed by the same method as the transmittance adjusting layer 109.

Subsequently, the first interface layer 105 is formed on the reflective layer 108 (on the first dielectric layer 106 in the case of the configuration provided with the first dielectric layer 106). The first interface layer 105 can be formed by the same method as the transmittance adjusting layer 109. The first interface layer 105 can be formed by sputtering of a sputtering target with the composition adjusted to contain a material expressed by either one of the above-mentioned formulae (2) and (4), or to consist only of such a material, using one power source. For example, in the case of forming the first interface layer 105 having a composition of $(Al_2O_3)_{70}$ $(Cr_2O_3)_{30}$ (mol %), the first interface layer 105 can be formed by film formation using a sputtering target that has a composition of $(Al_2O_3)_{70}$ $(Cr_2O_3)_{30}$ (mol %) in an Ar gas atmosphere or in an atmosphere of a mixed gas of Ar and $O_2$ gas. Whether the film actually formed has the desired composition can be checked by compositional analysis using, for example, an X-ray microanalyzer. Since oxygen of the oxide in the film tends to be deficient or excessive, depending on the sputtering apparatus, there may be a shift from the desired composition in some cases. Therefore, the desired film composition can be obtained by adjusting the composition of the sputtering target in advance, or by adjusting the amount of $O_2$ gas to be mixed with Ar gas.

Subsequently, the recording layer 104 is formed on the first interface layer 105. The recording layer 104 can be formed, for example, by sputtering of a sputtering target that contains Ge—Te, where Ge is not less than 40 atom %, or a sputtering target that contains at least one material selected from Sb—Ge and Sb—Te, where Sb is not less than 70 atom %, using one power source. Further, the recording layer 104 can be formed also by simultaneous sputtering of at least two sputtering targets selected from a sputtering target that contains Te, a sputtering target that contains Bi, a sputtering target that contains Ge, a sputtering target that contains Sb, a sputtering target that contains Ge—Te, a sputtering target that contains Sb—Ge, a sputtering target that contains Sb—Te, etc, using at least two power sources, for example. In such a case, since the composition of the recording layer to be obtained is determined depending, for example, on the type and the number of the sputtering target to be used, the output of the power source, and the like, it is preferable that these conditions be appropriately selected for forming the recording layer so that the recording layer 104 with the desired composition can be obtained. The use of two or more sputtering targets, as described above, is useful, for example, in the case where it is difficult to form a sputtering target of a mixture.

Further, in the case where the recording layer 104 is formed by stacking two or more layers as a recording body, it also can be formed by sequential and/or simultaneous sputtering of at least two sputtering targets selected from a sputtering target that contains Te, a sputtering target that contains Bi, a sputtering target that contains Ge, a sputtering target that contains Sb, a sputtering target that contains Ge—Te, a sputtering target that contains Sb—Ge, a sputtering target that contains Sb—Te, etc., using two or more power sources, for example. In other words, in order to form a recording body, sputtering may be performed twice or more, using two or more sputtering targets, or alternatively, two or more sputtering targets may be sputtered simultaneously.

As atmosphere gases for sputtering, a rare gas, or a mixed gas of a rare gas and a reactive gas (such as at least one selected from $N_2$ gas and $O_2$ gas) can be used, in either the case of forming the recording layer 104 with a single-layer structure or the case of forming the recording layer 104 as a recording body. Further, any one of a DC power source, a pulsed DC power source, and an RF power source can be used as power sources for sputtering.

Subsequently, the second interface layer 103 is formed on the recording layer 104. The second interface layer 103 can be formed by the same method as the transmittance adjusting layer 109. The second interface layer 103 can be formed by sputtering of a sputtering target with the composition adjusted to contain a material expressed by either one of the above-mentioned formulae (1) and (3), or to consist only of such a material, using one power source. For example, in the case of forming the second interface layer 103 having a composition of $(Nb_2O_5)_{70}$ $(Cr_2O_3)_{30}$ (mol %), the second interface layer 103 can be formed by film formation using a sputtering target that has a composition of $(Nb_2O_5)_{70}$ $(Cr_2O_3)_{30}$ (mol %) in an Ar gas atmosphere or in an atmosphere of a mixed gas of Ar and $O_2$ gas. Whether the film actually formed has the desired composition can be checked by compositional analysis using, for example, an X-ray microanalyzer. Since oxygen of the oxide in the film tends to be deficient or excessive, depending on the sputtering apparatus, there may be a shift from the desired composition in some cases. Therefore, the desired film composition can be obtained by adjusting the composition of the sputtering target in advance, or by adjusting the amount of $O_2$ gas to be mixed with Ar gas.

Subsequently, the second dielectric layer 102 is formed on the second interface layer 103, as needed. The second dielectric layer 102 can be formed by the same method as the transmittance adjusting layer 109.

Finally, the transparent layer 2 is formed on the second interface layer 103 (on the second dielectric layer 102 in the case of the configuration provided with the second dielectric layer 102). The transparent layer 2 can be formed by applying a photocurable resin (particularly, an ultraviolet curable resin) or a slow-acting thermosetting resin onto the second interface layer 103 (or the second dielectric layer 102), performing spin coating, and then curing the resin. Further, a transparent substrate in the form of a disc may be used as the transparent layer 2, and the substrate is made, for example, of glass or a resin, such as polycarbonate, amorphous polyolefin and PMMA. In this case, the transparent layer 2 can be formed by applying a resin, such as a photocurable resin (particularly, an ultraviolet curable resin) and a slow-acting thermosetting resin, onto the second interface layer 103 (or the second dielectric layer 102), bringing the substrate into close contact with the second dielectric layer 102, performing spin coating, and then curing the resin. Further, the transparent layer 2 can be formed also by uniformly applying an adhesive resin to the substrate in advance, and bringing it into close contact with the second interface layer 103 (or the second dielectric layer 102).

After the formation of the second dielectric layer 102 or the transparent layer 2, an initialization process of crystallizing the entire surface of the recording layer 104 may be performed, as needed. The crystallization of the recording layer 104 can be achieved by irradiation with a laser beam.

Thus, the information recording medium 9 can be produced. In this embodiment, sputtering is used for forming each layer as a film forming method, which, however, is not limited thereto. Vacuum evaporation, ion plating, CVD, or MBE also can be used therefor. Further, an information layer other than the N-th information layer 10 may be formed by the same method as the N-th information layer 10.

Embodiment 2

Figure 2:
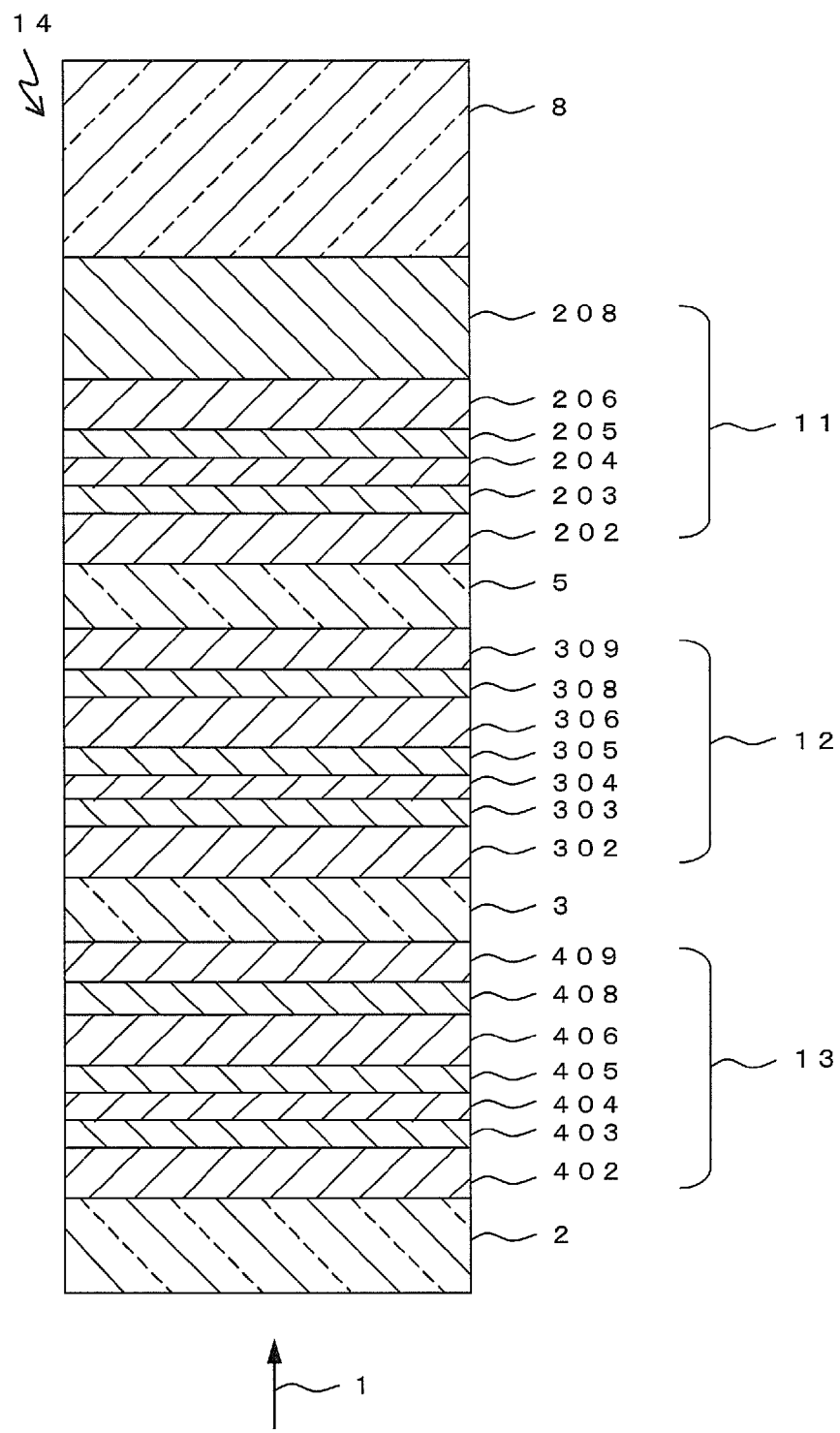
FIG. 2 is a partial sectional view showing an example of the layer structure of an information recording medium of the present invention that includes three information layers.

As Embodiment 2, an example of an information recording medium in which N is 3 in the multilayer information recording medium of Embodiment 1 of the present invention, that is, an information recording medium composed of three information layers is described. FIG. 2 shows a partial sectional view of an information recording medium 14 of Embodiment 2. The information recording medium 14 is a three-layer information recording medium on/from which information can be recorded/reproduced by irradiation with the laser beam 1 from one side.

The information recording medium 14 is composed of the substrate 8, and a first information layer 11, the interlayer 5, a second information layer 12, the interlayer 3, a third information layer 13 and the transparent layer 2 that are sequentially stacked on the substrate 8. The substrate 8, the interlayers 3 and 5, and the transparent layer 2, respectively, can be formed using the same materials as those described in Embodiment 1. Further, they have the same shapes and functions as those described in Embodiment 1.

Hereinafter, the configurations of the first information layer 11, the second information layer 12 and the third information layer 13 are described in detail. In this embodiment, the second information layer 12 and the third information layer 13 correspond to the L-th information layer in the information recording medium of the present invention. However, the first information layer 11 also functions as the L-th information layer, if the configurations of the first interface layer 105 and the second interface layer 103 described in Embodiment 1 are applied respectively to the configurations of the first interface layer and the second interface layer of the first information layer 11.

The first information layer 11 includes a second interface layer 203, a recording layer 204, a first interface layer 205 and a reflective layer 208 that are disposed in this order from the laser beam 1 incident side. The second dielectric layer 202 may be provided therein between the interlayer 5 and the second interface layer 203. Further, the first dielectric layer 206 may be provided therein between the first interface layer 205 and the reflective layer 208. Furthermore, an interface layer 207 (not shown in FIG. 2, which is described as the "interface layer 207" in this description for convenience of description) may be further provided therein between the first interface layer 205 and the reflective layer 208 (between the first dielectric layer 206 and the reflective layer 208 in the case of the configuration provided with the first dielectric layer 206). With respect to the first information layer 11, information is recorded/reproduced using the laser beam 1 that has been transmitted through the transparent layer 2, the third information layer 13, the interlayer 3, the second information layer 12 and the interlayer 5.

The second dielectric layer 202 can be formed using the same material as the second dielectric layer 102 in Embodiment 1. Further, the function thereof is the same as that of the second dielectric layer 102 in Embodiment 1.

The thickness of the second dielectric layer 202 can be precisely determined by calculation based on a matrix method so as to satisfy the conditions that increase the change in the amount of reflected light between the state where the recording layer 204 is in the crystalline phase and the state where it is in the amorphous phase. The thickness of the second dielectric layer 202 is desirably within the range of 50 nm to 80 nm, more preferably within the range of 60 nm to 70 nm.

The second interface layer 203 can be formed using the same material as the second interface layer 103 in Embodiment 1. Further, it has the same shape and function as the second interface layer 103 of Embodiment 1. Further, the second interface layer 203 can be formed using a material containing at least one selected from oxides, nitrides, carbides, sulfides and fluorides. Above all, a material containing Cr and O (in particular, an oxide in which Cr and O form $Cr_2O_3$), a material containing In and O (in particular, an oxide in which In and O form $In_2O_3$), and a material containing Ga and O (in particular, an oxide in which Ga and O form $Ga_2O_3$) are preferably used. Further, the second interface layer 203 may further contain at least one element selected from Zr, Hf and Y other than these. Such elements are more preferably contained therein in the form of an oxide. $ZrO_2$ and $HfO_2$ each are a transparent material that has a high melting point of about 2700 to 2800° C. and low thermal conductivity among oxides. These can enhance the repeated rewriting performance of the information recording medium. Further, $Y_2O_3$ is a transparent material that has a function of stabilizing $ZrO_2$ and $HfO_2$. Further, even when the second interface layer 203 is formed partially or entirely in contact with the recording layer 204, the first information layer 11 with excellent repeated rewriting performance and high reliability can be achieved as well by containing any one of these three oxides or mixing a plurality thereof. A material further containing Si in addition to Cr, Ga, In, Zr, Hf, Y and O can be used for the second interface layer 203. When Si is contained in the second interface layer 203, for example, as $SiO_2$, the transparency is increased, so that the first information layer 11 with excellent recording performance can be achieved.

The recording layer 204 can be formed using the same material as the recording layer 104 of Embodiment 1. The thickness of the recording layer 204 is preferably within the range of 6 nm to 15 nm in order to enhance the recording sensitivity of the first information layer 11, in the case where the material thereof is a material in which a reversible phase change occurs. Even in this range, in the case of the recording layer 204 being thick, its thermal influence on the adjacent regions due to thermal diffusion in the in-plane direction increases. On the other hand, in the case of the recording layer 204 being thin, the reflectance of the first information layer 11 decreases. Accordingly, the thickness of the recording layer 204 is more preferably within the range of 8 nm to 13 nm. Further, in the case where the recording layer 204 is formed using a material (for example, Te—Pd—O) in which an irreversible phase change occurs, the thickness of the recording layer 204 is preferably within the range of 10 nm to 40 nm.

The first interface layer 205 can be formed using the same material as the first interface layer 105 of Embodiment 1. Further, it has the same shape and function as the first interface layer 105 of Embodiment 1. As is the second interface layer 203, the first interface layer 205 can be formed using a material containing at least one selected from oxides, nitrides, carbides, sulfides and fluorides. Above all, materials containing $Cr_2O_3$, $In_2O_3$, $Ga_2O_3$, $ZrO_2$, $HfO_2$, $Y_2O_3$ and $SiO_2$ can be used suitably therefor.

The first dielectric layer 206 can be formed using the same material as the first dielectric layer 106 of Embodiment 1. Further, it has the same shape and function as the first dielectric layer 106 of Embodiment 1.

The reflective layer 208 can be formed using the same material as the reflective layer 108 of Embodiment 1. Further, it has the same function as the reflective layer 108 of Embodiment 1. The thickness of the reflective layer 208 is preferably 30 nm or more, which allows sufficient heat diffusion function. Even in this range, in the case of the reflective layer 208 having a thickness over 200 nm, the heat diffusion function increases excessively, resulting in a decrease in the recording sensitivity of the first information layer 11. Accordingly, the thickness of the reflective layer 208 is more preferably within the range of 30 nm to 200 nm.

Further, another interface layer may be disposed between the reflective layer 208 and the first interface layer 205 (between the reflective layer 208 and the first dielectric layer 206 in the case of the configuration provided with the first dielectric layer 206). In the case of providing such an interface layer in the information recording medium 14 shown in FIG. 2, the interface layer can be formed as a layer denoted by the reference numeral 207 between the layer denoted by the reference numeral 208 and the layer denoted by the reference numeral 206. In this case, a material having lower thermal conductivity than the material for the reflective layer 208 described above can be used as a material for forming the interface layer 207. In the case of using Ag alloy for the reflective layer 208, Al or Al alloy can be used as a material for the interface layer 207, for example.

Further, examples of the material to be used for the interface layer 207 include elements such as Cr, Ni, Si and C, and oxides such as $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$ and $TeO_2$. Further, nitrides such as C—N, Ti—N, Zr—N, Nb—N, Ta—N, Si—N, Ge—N, Cr—N, Al—N, Ge—Si—N and Ge—Cr—N also can be used therefor. Further, sulfides such as ZnS, carbides such as SiC, fluorides such as $LaF_3$ and $CeF_3$, and C also can be used. Further, a mixture containing one or a plurality of materials selected from the above-mentioned materials also can be used to form the interface layer 207. The thickness of the interface layer 207 is preferably within the range of 3 nm to 100 nm, more preferably within the range of 10 nm to 50 nm.

In the first information layer 11, the reflectance $R_{c1}$ (%) with respect to the laser beam 1 when the recording layer 204 is in the crystalline phase and the reflectance $R_{a1}$ (%) with respect to the laser beam 1 when the recording layer 204 is in the amorphous phase preferably satisfy $R_{a1}<R_{c1}$. This allows high reflectance to be achieved in the initial state in which no information is recorded, and recording/reproduction operations to be stably performed. Further, $R_{c1}$ and $R_{a1}$ preferably satisfy $1\leq R_{a1}\leq 12$ and $16\leq R_{c1}\leq 48$, more preferably satisfy $1\leq R_{a1}\leq 6$ and $16\leq R_{c1}\leq 32$, in order to increase the reflectance difference $(R_{c1}-R_{a1})$ so that good recording/reproduction properties can be obtained.

The second information layer 12 includes a second dielectric layer 302, a second interface layer 303, a recording layer 304, a first interface layer 305, a first dielectric layer 306, a reflective layer 308 and a transmittance adjusting layer 309 that are disposed in this order from the laser beam 1 incident side. The second dielectric layer 302 and the first dielectric layer 306 can be omitted, as needed. With respect to the second information layer 12, information is recorded/reproduced using the laser beam 1 that has been transmitted through the transparent layer 2, the third information layer 13 and the interlayer 3.

The second dielectric layer 302, the second interface layer 303, the recording layer 304, the first interface layer 305, the first dielectric layer 306, the reflective layer 308 and the transmittance adjusting layer 309 that constitute the second information layer 12, respectively, can be formed using the same materials as the second dielectric layer 102, the second interface layer 103, the recording layer 104, the first interface layer 105, the first dielectric layer 106, the reflective layer 108 and the transmittance adjusting layer 109 of the N-th information layer 10 in Embodiment 1. Further, they have the same shapes and functions as those described in Embodiment 1.

In the second information layer 12, the transmittance $T_{c2}$ (%) with respect to the laser beam 1 when the recording layer 304 is in the crystalline phase and the transmittance $T_{a2}$ (%) with respect to the laser beam 1 when the second the recording layer 304 is in the amorphous phase preferably satisfy $45\leq T_{c2}$ and $45\leq T_{a2}$, more preferably satisfy $50\leq T_{c2}$ and $50\leq T_{a2}$, in order to allow a necessary amount of the laser beam for recording/reproduction to reach the information layer located farther than the second information layer 12 from the laser beam 1 incident side.

The transmittances $T_{c2}$ and $T_{a2}$ of the second information layer 12 preferably satisfy $-5\leq(T_{c2}-T_{a2})\leq 5$, more preferably satisfy $-3\leq(T_{c2}-T_{a2})\leq 3$. When $T_{c2}$ and $T_{a2}$ satisfy these conditions, the change in the transmittance of the second information layer 12 according to the state of the recording layer 304 has less influence in recording/reproduction with respect to the information layer located farther than the second information layer 12 from the laser beam 1 incident side. Thus, good recording/reproduction properties can be obtained.

In the second information layer 12, the reflectance $R_{c2}$ (%) with respect to the laser beam 1 when the recording layer 304 is in the crystalline phase and the reflectance $R_{a2}$ (%) with respect to the laser beam 1 when the recording layer 304 is in the amorphous phase preferably satisfy $R_{a2}<R_{c2}$. This allows high reflectance to be achieved in the initial state in which no information is recorded, and recording/reproduction operations to be stably performed. Further, $R_{c2}$ and $R_{a2}$ preferably satisfy $0.3\leq R_{a2}\leq 4$ and $5\leq R_{c2}\leq 15$, more preferably satisfy $0.3\leq R_{a2}\leq 3$ and $5\leq R_{c2}\leq 9$, in order to increase the reflectance difference $(R_{c2}-R_{a2})$ so that good recording/reproduction properties can be obtained.

The third information layer 13 includes a second dielectric layer 402, a second interface layer 403, a recording layer 404, a first interface layer 405, a first dielectric layer 406, a reflective layer 408 and a transmittance adjusting layer 409 that are disposed in this order from the laser beam 1 incident side. The second dielectric layer 402 and the first dielectric layer 406 may be omitted, as needed.

The second dielectric layer 402, the second interface layer 403, the recording layer 404, the first interface layer 405, the first dielectric layer 406, the reflective layer 408 and the transmittance adjusting layer 409 that constitute the third information layer 13, respectively, can be formed using the same materials as the second dielectric layer 102, the second interface layer 103, the recording layer 104, the first interface layer 105, the first dielectric layer 106, the reflective layer 108 and the transmittance adjusting layer 109 of the N-th information layer 10 in Embodiment 1. Further, they have the same shapes and functions as those described in Embodiment 1.

In the third information layer 13, the transmittance $T_{c3}$ (%) with respect to the laser beam 1 when the recording layer 404 is in the crystalline phase and the transmittance $T_{a3}$ (%) with respect to the laser beam 1 when the recording layer 404 is in the amorphous phase preferably satisfy $50\leq T_{c3}$ and $50\leq T_{a3}$, more preferably satisfy $55\leq T_{c3}$ and $55\leq T_{a3}$, in order to allow a necessary amount of the laser beam for recording/reproduction to reach the information layers located farther than the third information layer 13 from the laser beam 1 incident side.

The transmittances $T_{c3}$ and $T_{a3}$ of the third information layer 13 preferably satisfy $-5\leq(T_{c3}-T_{a3})\leq 5$, more preferably satisfy $-3\leq(T_{c3}-T_{a3})\leq 3$. When $T_{c3}$ and $T_{a3}$ satisfy these conditions, the change in the transmittance of the third information layer 13 according to the state of the recording layer 404 has less influence in recording/reproduction with respect to the information layers located farther than the third information layer 13 from the laser beam 1 incident side. Thus, good recording/reproduction properties can be obtained.

In the third information layer 13, the reflectance $R_{c3}$ (%) with respect to the laser beam 1 when the recording layer 404 is in the crystalline phase and the reflectance $R_{a3}$ (%) with respect to the laser beam 1 when the first the recording layer 404 is in the amorphous phase preferably satisfy $R_{a3}<R_{c3}$.

This allows high reflectance to be achieved in the initial state in which no information is recorded, and recording/reproduction operations to be stably performed. Further, $R_{c3}$, $R_{a3}$ preferably satisfy $0.1 \leq R_{a3} \leq 1$ and $1.5 \leq R_{c3} \leq 5$, more preferably satisfy $0.1 \leq R_{a3} \leq 0.7$ and $1.5 \leq R_{c3} \leq 3$, in order to increase the reflectance difference ($R_{c3}-R_{a3}$) so that good recording/reproduction properties can be obtained.

The effective amounts of the reflected light from the first information layer 13, the second information layer 14 and the third information layer 15 can be adjusted (for example, to the effective reflectance of 2%) by designing $R_{c1}$, $R_{a1}$, $R_{c2}$, $R_{a2}$, $R_{c3}$, $R_{a3}$, $T_{c2}$, $T_{a2}$, $T_{c3}$ and $T_{a3}$ as described above.

The information recording medium 14 can be produced by the method described below.

First, the substrate 8 (with a thickness, for example, of 1.1 mm) is prepared, and placed in a film forming apparatus.

Subsequently, the first information layer is formed on the substrate 8. Specifically, the reflective layer 208, the first interface layer 205, the recording layer 204 and the second interface layer 203 are first formed on the substrate 8 in this order. At this time, the interface layer 207 may be formed therein between the reflective layer 208 and the first interface layer 205, as needed. Further, the first dielectric layer 206 may be formed therein between the reflective layer 208 and the first interface layer 205, as needed. Furthermore, the second dielectric layer 202 may be formed therein between the interlayer 5 and the second interface layer 203, as needed.

When the reflective film 101 is formed on the substrate 8, in the case where the substrate 11 has guide grooves, the reflective film 101 is formed on the side of the guide grooves. The reflective layer 208 can be formed by the same method as the reflective layer 108 of Embodiment 1.

Subsequently, the interface layer 207 is formed on the reflective layer 208, as needed. The interface layer 207 can be formed by the same method as the reflective layer 108 or the transmittance adjusting layer 109 of Embodiment 1.

Subsequently, the first dielectric layer 206 is formed on the reflective layer 208 (on the interface layer 207 in the case of the configuration provided with the interface layer 207), as needed. The first dielectric layer 206 can be formed by the same method as the transmittance adjusting layer 109 of Embodiment 1.

Subsequently, the first interface layer 205 is formed on the reflective layer 208 (on the first dielectric layer 206 in the case of the configuration provided with the first dielectric layer 206, or on the interface layer 207 in the case of the configuration not provided with the first dielectric layer 206 and provided with the interface layer 207). The first interface layer 205 can be formed by the same method as the first interface layer 105 of Embodiment 1.

Subsequently, the recording layer 204 is formed on the first interface layer 205. The recording layer 204 can be formed by the same method as the recording layer 104 of Embodiment 1, using a sputtering target corresponding to its composition.

Subsequently, the second interface layer 203 is formed on the recording layer 204. The second interface layer 203 can be formed by the same method as the second interface layer 103 of Embodiment 1.

Subsequently, the second dielectric layer 202 is formed on the second interface layer 203, as needed. The second dielectric layer 202 can be formed by the same method as the transmittance adjusting layer 109 of Embodiment 1.

Thus, the first information layer 11 is formed.

Subsequently, the interlayer 5 (with a thickness, for example, of 25 μm) is formed on the second interface layer 203 of the first information layer 11 (on the second dielectric layer 202 in the case of the configuration provided with the second dielectric layer 202). The interlayer 5 can be formed by applying a photocurable resin (particularly, an ultraviolet curable resin) or a slow-acting thermosetting resin onto the second interface layer 203 (or the second dielectric layer 202), performing spin coating, and then curing the resin. In the case where the interlayer 5 is to be provided with guide grooves for the laser beam 1, such guide grooves can be formed by bringing a substrate (mold) formed with grooves into close contact with the resin before curing, thereafter curing the resin, and then separating the substrate (mold) therefrom. Not only the above-mentioned spin coating, but also printing techniques such as screen printing and ink jetting can be used as a method for forming an interlayer, in application to microfabrication technology.

After the formation of the second interface layer 203 or the second dielectric layer 202, or after the formation of the interlayer 5, an initialization process of crystallizing the entire surface of the recording layer 204 may be performed, as needed. The crystallization of the recording layer 204 can be achieved by irradiation with a laser beam.

Subsequently, the second information layer 12 is formed on the interlayer 5. Specifically, the transmittance adjusting layer 309, the reflective layer 308, the first interface layer 305, the recording layer 304 and the second interface layer 303 are first formed on the interlayer 5 in this order. At this time, the first dielectric layer 306 may be formed therein between the reflective layer 308 and the first interface layer 305, as needed. Further, after the formation of the second interface layer 303, the second dielectric layer 302 may be formed, as needed. These layers, respectively, can be formed by the same methods as the transmittance adjusting layer 109, the reflective layer 108, the first dielectric layer 106, the first interface layer 105, the recording layer 104, the second interface layer 103 and the second dielectric layer 102 of the N-th information layer 10 described in Embodiment 1.

Thus, the second information layer 12 is formed.

Subsequently, the interlayer 3 (with a thickness, for example, of 18 μm) is formed on the second interface layer 303 of the second information layer 12 (on the second dielectric layer 302 in the case of the configuration provided with the second dielectric layer 302) by the same method as the above-mentioned interlayer 5.

After the formation of the second interface layer 303 or the second dielectric layer 302, or after the formation of the interlayer 3, an initialization process of crystallizing the entire surface of the recording layer 204 and/or the recording layer 304 may be performed, as needed. The crystallization of the recording layer 204 and/or the recording layer 304 can be achieved by irradiation with a laser beam.

Subsequently, the third information layer 13 is formed on the interlayer 3. Specifically, the transmittance adjusting layer 409, the reflective layer 408, the first interface layer 405, the recording layer 404 and the second interface layer 403 are first formed on the interlayer 3 in this order. At this time, the first dielectric layer 406 may be formed therein between the reflective layer 408 and the first interface layer 405, as needed. Further, after the formation of the second interface layer 403, the second dielectric layer 402 may be formed, as needed. These layers, respectively, can be formed by the same methods as the transmittance adjusting layer 109, the reflective layer 108, the first dielectric layer 106, the first interface layer 105, the recording layer 104, the second interface layer 103 and the second dielectric layer 102 of the N-th information layer 10 described in Embodiment 1.

Thus, the third information layer 13 is formed.

Finally, the transparent layer 2 (with a thickness, for example, of 57 μm) is formed on the second interface layer 403 of the third information layer 13 (on the second dielectric layer 402 in the case of the configuration provided with the second dielectric layer 402). The transparent layer 2 can be formed by the method described in Embodiment 1.

After the formation of the second interface layer 403 or the second dielectric layer 402, or after the formation of the transparent layer 2, an initialization process of crystallizing the entire surface of the recording layer 204, the recording layer 304 and/or the recording layer 404 may be performed, as needed. The crystallization of the recording layer 204, the recording layer 304 and/or the recording layer 404 can be achieved by irradiation with a laser beam.

Thus, the information recording medium 14 can be produced. In this embodiment, sputtering is used for forming each layer as a film forming method, which, however, is not limited thereto. Vacuum evaporation, ion plating, CVD, or MBE also can be used therefor.

Embodiment 3

Figure 3:
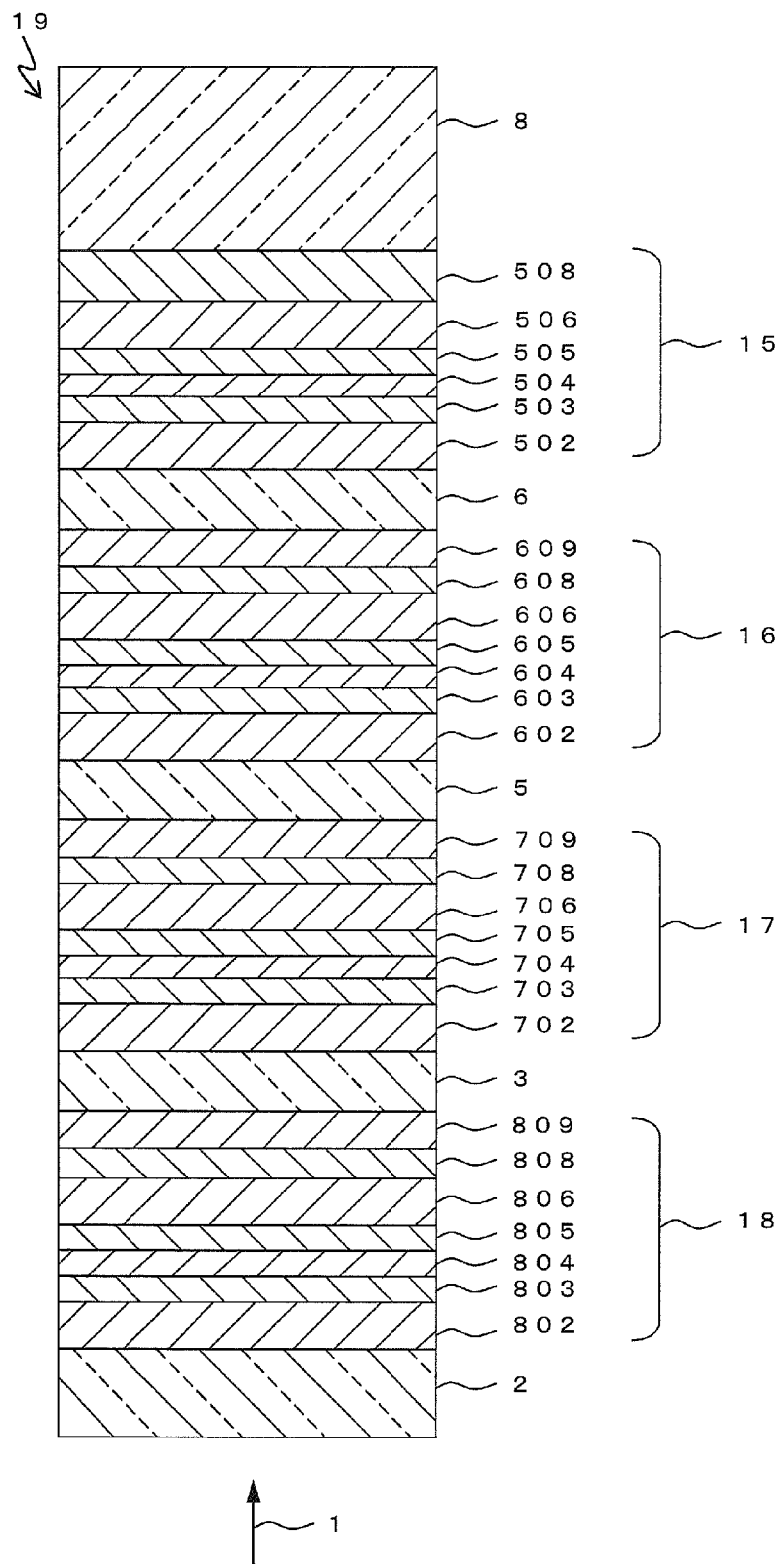
FIG. 3 is a partial sectional view showing an example of the layer structure of an information recording medium of the present invention that includes four information layers.

As Embodiment 3, an example of an information recording medium in which N is 4 in the multilayer information recording medium of Embodiment 1 of the present invention, that is, an information recording medium composed of four information layers is described. FIG. 3 shows a partial sectional view of an information recording medium 19 of Embodiment 3. The information recording medium 19 is a four-layer information recording medium on/from which information can be recorded/reproduced by irradiation with the laser beam 1 from one side.

The information recording medium 19 is composed of the substrate 8, and the first information layer 15, the interlayer 6, the second information layer 16, the interlayer 5, the third information layer 17, the interlayer 3, the fourth information layer 18 and the transparent layer 2 that are sequentially stacked on the substrate 8. The substrate 8, the interlayers 3, 5 and 6, and the transparent layer 2, respectively, can be formed using the same materials as those described in Embodiments 1 and 2. Further, they have the same shapes and functions as those described in Embodiments 1 and 2.

Hereinafter, the configurations of the first information layer 15, the second information layer 16, the third information layer 17 and the fourth information layer 18 are described in detail. In this embodiment, the second information layer 16, the third information layer 17 and the fourth information layer 18 correspond to the L-th information layer of the information recording medium of the present invention. However, the first information layer 15 also functions as the L-th information layer, if the configurations of the first interface layer 105 and the second interface layer 103 described in Embodiment 1 are applied respectively to the configurations of the first interface layer and the second interface layer of the first information layer 15.

The first information layer 15 includes a second interface layer 503, a recording layer 504, a first interface layer 505 and a reflective layer 508 that are disposed in this order from the laser beam 1 incident side. A second dielectric layer 502 may be provided therein between the interlayer 6 and the second interface layer 503. Further, a first dielectric layer 506 may be provided therein between the first interface layer 505 and the reflective layer 508. Furthermore, an interface layer 507 (not shown in FIG. 3, which is described as the "interface layer 507" in this description for convenience of description) may be further provided therein between the first interface layer 505 and the reflective layer 508 (between the first dielectric layer 506 and the reflective layer 508 in the case of the configuration provided with the first dielectric layer 506).

With respect to the first information layer 15, information is recorded/reproduced using the laser beam 1 that has been transmitted through the transparent layer 2, the fourth information layer 18, the interlayer 3, the third information layer 17, the interlayer 5, the second information layer 16 and interlayer 6.

The second dielectric layer 502, the second interface layer 503, the recording layer 504, the first interface layer 505, the first dielectric layer 506, the interface layer 507 and the reflective layer 508 that constitute the first information layer 15, respectively, can be formed using the same materials as the second dielectric layer 202, the second interface layer 203, the recording layer 204, the first interface layer 205, the first dielectric layer 206, the interface layer 207 and the reflective layer 208 of the first information layer 11 of Embodiment 2. Further, they have the same shapes and functions as those described in Embodiment 2.

In the first information layer 15, the reflectance $R_{c1}$ (%) with respect to the laser beam 1 when the recording layer 504 is in the crystalline phase and the reflectance $R_{a1}$ (%) with respect to the laser beam 1 when the recording layer 504 is in the amorphous phase more preferably satisfy $R_{a1} \leq R_{c1}$. This allows high reflectance to be achieved in the initial state in which no information is recorded, and recording/reproduction operations to be stably performed. Further, $R_{c1}$ and $R_{a1}$ preferably satisfy $1 \leq R_{a1} \leq 12$ and $16 \leq R_{c1} \leq 48$, more preferably satisfy $1 \leq R_{a1} \leq 6$ and $16 \leq R_{c1} \leq 32$, in order to increase the reflectance difference ($R_{c1} - R_{a1}$) so that good recording/reproduction properties can be obtained.

The second information layer 16 includes a second interface layer 603, a recording layer 604, a first interface layer 605, a reflective layer 608 and a transmittance adjusting layer 609 that are disposed in this order from the laser beam 1 incident side. A second dielectric layer 602 may be provided therein between the interlayer 5 and the second interface layer 603. Further, a first dielectric layer 606 may be provided therein between the first interface layer 605 and the reflective layer 608. With respect to the second information layer 16, information is recorded/reproduced using the laser beam 1 that has been transmitted through the transparent layer 2, the fourth information layer 18, the interlayer 3, the third information layer 17 and the interlayer 5.

The second dielectric layer 602, the second interface layer 603, the recording layer 604, the first interface layer 605, the first dielectric layer 606, the reflective layer 608 and the transmittance adjusting layer 609 that constitute the second information layer 16, respectively, can be formed using the same materials as the second dielectric layer 102, the second interface layer 103, the recording layer 104, the first interface layer 105, the first dielectric layer 106, the reflective layer 108 and the transmittance adjusting layer 109 of the N-th information layer 10 in Embodiment 1. Further, they have the same shapes and functions as those described in Embodiment 1.

In the second information layer 16, the transmittance $T_{c2}$ (%) with respect to the laser beam 1 when the recording layer 604 is in the crystalline phase, and the transmittance $T_{a2}$ (%) with respect to the laser beam 1 when the recording layer 604 is in the amorphous phase preferably satisfy $55 \leq T_{c2}$ and $55 \leq T_{a2}$, more preferably satisfy $60 \leq T_{c2}$ and $60 \leq T_{a2}$, in order to allow a necessary amount of the laser beam for recording/reproduction to reach the information layer located farther than the second information layer 16 from the laser beam 1 incident side.

The transmittances $T_{c2}$ and $T_{a2}$ of the second information layer 16 preferably satisfy $-5 \leq (T_{c2} - T_{a2}) \leq 5$, more preferably satisfy $-3 \leq (T_{c2} - T_{a2}) \leq 3$. When $T_{c2}$ and $T_{a2}$ satisfy these conditions, the change in the transmittance of the second information layer 16 according to the state of the recording layer 604 has less influence in recording/reproduction with respect to the information layer located farther than the second information layer 16 from the laser beam 1 incident side. Thus, good recording/reproduction properties can be obtained.

In the second information layer 16, the reflectance $R_{c2}$ (%) with respect to the laser beam 1 when the recording layer 604 is in the crystalline phase and the reflectance $R_{a2}$ (%) with respect to the laser beam 1 when the recording layer 604 is in the amorphous phase more preferably satisfy $R_{a2} \leq R_{c2}$. This allows high reflectance to be achieved in the initial state in which no information is recorded, and recording/reproduction operations to be stably performed. Further, $R_{c2}$ and $R_{a2}$ preferably satisfy $0.3 \leq R_{a2} \leq 4$ and $5 \leq R_{c2} \leq 15$, more preferably satisfy $0.3 \leq R_{a2} \leq 3$ and $5 \leq R_{c2} \leq 9$, in order to increase the reflectance difference ($R_{c2}-R_{a2}$) so that good recording/reproduction properties can be obtained.

The third information layer 17 includes a second interface layer 703, a recording layer 704, a first interface layer 705, a reflective layer 708 and a transmittance adjusting layer 709 that are disposed in this order from the laser beam 1 incident side. A second dielectric layer 702 may be provided therein between the interlayer 3 and the second interface layer 703. Further, a first dielectric layer 706 may be provided therein between the first interface layer 705 and the reflective layer 708. With respect to the third information layer 17, information is recorded/reproduced using the laser beam 1 that has been transmitted through the transparent layer 2, the fourth information layer 18 and the interlayer 3.

The second dielectric layer 702, the second interface layer 703, the recording layer 704, the first interface layer 705, the first dielectric layer 706, the reflective layer 708 and the transmittance adjusting layer 709 that constitute the third information layer 17, respectively, can be formed using the same materials as the second dielectric layer 102, the second interface layer 103, the recording layer 104, the first interface layer 105, the first dielectric layer 106, the reflective layer 108 and the transmittance adjusting layer 109 of the N-th information layer 10 in Embodiment 1. Further, they have the same shapes and functions as those described in Embodiment 1.

In the third information layer 17, the transmittance $T_{c3}$ (%) with respect to the laser beam 1 when the recording layer 704 is in the crystalline phase and the transmittance $T_{a3}$ (%) with respect to the laser beam 1 when the recording layer 704 is in the amorphous phase preferably satisfy $60 \leq T_{c3}$ and $60 \leq T_{a3}$, more preferably satisfy $65 \leq T_{c3}$ and $65 \leq T_{a3}$, in order to allow a necessary amount of the laser beam for recording/reproduction to reach the information layers located farther than the third information layer 17 from the laser beam 1 incident side.

The transmittances $T_{c3}$ and $T_{a3}$ of the third information layer 17 preferably satisfy $-5 \leq (T_{c3}-T_{a3}) \leq 5$, more preferably satisfy $-3 \leq (T_{c3}-T_{a3}) \leq 3$. When $T_{c3}$ and $T_{a3}$ satisfy these conditions, the change in the transmittance of the third information layer 17 according to the state of the recording layer 704 has less influence in recording/reproduction with respect to the information layers located farther than the third information layer 17 from the laser beam 1 incident side. Thus, good recording/reproduction properties can be obtained.

In the third information layer 17, the reflectance $R_{c3}$ (%) with respect to the laser beam 1 when the recording layer 704 is in the crystalline phase and the reflectance $R_{a3}$ (%) with respect to the laser beam 1 when the recording layer 704 is in the amorphous phase more preferably satisfy $R_{a3} \leq R_{c3}$. This allows high reflectance to be achieved in the initial state in which no information is recorded, and recording/reproduction operations to be stably performed. Further, $R_{c3}$ and $R_{a3}$ preferably satisfy $0.1 \leq R_{a3} \leq 1$ and $1.5 \leq R_{c3} \leq 6$, more preferably satisfy $0.1 \leq R_{a3} \leq 0.7$ and $1.5 \leq R_{c3} \leq 3.5$, in order to increase the reflectance difference ($R_{c3}-R_{a3}$) so that good recording/reproduction properties can be obtained.

The fourth information layer 18 includes a second interface layer 803, a recording layer 804, a first interface layer 805, a reflective layer 808 and a transmittance adjusting layer 809 that are disposed in this order from the laser beam 1 incident side. A second dielectric layer 802 may be provided further therein between the transparent layer 2 and the second interface layer 803. Further, a first dielectric layer 806 may be provided further therein between the first interface layer 805 and the reflective layer 808.

The second dielectric layer 802, the second interface layer 803, the recording layer 804, the first interface layer 805, the first dielectric layer 806, the reflective layer 808 and the transmittance adjusting layer 809 that constitute the fourth information layer 18, respectively, can be formed using the same materials as the second dielectric layer 102, the second interface layer 103, the recording layer 104, the first interface layer 105, the first dielectric layer 106, the reflective layer 108 and the transmittance adjusting layer 109 of the N-th information layer 10 in Embodiment 1. Further, they have the same shapes and functions as those described in Embodiment 1.

In the fourth information layer 18, the transmittance $T_{C4}$ (%) with respect to the laser beam 1 when the recording layer 804 is in the crystalline phase and the transmittance $T_{a4}$ (%) with respect to the laser beam 1 when the recording layer 804 is in the amorphous phase preferably satisfy $60 \leq T_{c4}$ and $60 \leq T_{a4}$, more preferably satisfy $65 \leq T_{c4}$ and $65 \leq T_{a4}$, in order to allow a necessary amount of the laser beam for recording/reproduction to reach the information layers located farther than the fourth information layer 18 from the laser beam 1 incident side.

The transmittances $T_{c4}$ and $T_{a4}$ of the fourth information layer 18 preferably satisfy $-5 \leq (T_{c4}-T_{a4}) \leq 5$, more preferably satisfy $-3 \leq (T_{c4}-T_{a4}) \leq 3$. When $T_{c4}$ and $T_{a4}$ satisfy these conditions, the change in the transmittance of the fourth information layer 18 according to the state of the recording layer 804 has less influence in recording/reproduction with respect to the information layers located farther than the fourth information layer 18 from the laser beam 1 incident side. Thus, good recording/reproduction properties can be obtained.

In the fourth information layer 18, the reflectance $R_{c4}$ (%) with respect to the laser beam 1 when the recording layer 804 is in the crystalline phase and the reflectance $R_{a4}$ (%) with respect to the laser beam 1 when the recording layer 804 is in the amorphous phase more preferably satisfy $R_{a4} \leq R_{c4}$. This allows high reflectance to be achieved in the initial state in which no information is recorded, and recording/reproduction operations to be stably performed. Further, $R_{c4}$ and $R_{a4}$ preferably satisfy $0.1 \leq R_{a4} \leq 0.8$ and $1.2 \leq R_{c4} \leq 3$, more preferably satisfy $0.1 \leq R_{a4} \leq 0.5$ and $1.2 \leq R_{c4} \leq 2$, in order to increase the reflectance difference ($R_{c4}-R_{a4}$) so that good recording/reproduction properties can be obtained.

The effective amounts of the reflected light from the first information layer 15, the second information layer 16, the third information layer 17 and the fourth information layer 18 can be adjusted (for example, to the effective reflectance of 1.5%) by designing $R_{c1}$, $R_{a1}$, $R_{c2}$, $R_{a2}$, $R_{c3}$, $R_{a3}$, $R_{c4}$, $R_{a4}$, $T_{c2}$, $T_{a2}$, $T_{c3}$, $T_{a3}$, $T_{c4}$ and $T_{a4}$ as described above.

The information recording medium 19 can be produced by the method described below.

First, the substrate 8 (with a thickness, for example, of 1.1 mm) is prepared, and placed in a film forming apparatus.

Subsequently, the first information layer 15 is formed on the substrate 8. Specifically, the reflective layer 508, the first interface layer 505, the recording layer 504 and the second interface layer 503 are first formed on the substrate 8 in this order. At this time, the interface layer 507 may be formed therein between the reflective layer 508 and the first interface layer 505, as needed. Further, the first dielectric layer 506 may be formed therein between the reflective layer 508 and the first interface layer 505, as needed. Furthermore, the second dielectric layer 502 may be formed therein between the interlayer 6 and the second interface layer 503, as needed. These layers, respectively, can be formed by the same methods as the reflective layer 208, the interface layer 207, the first dielectric layer 206, the first interface layer 205, the recording layer 204, the second interface layer 203 and the second dielectric layer 20 of the first information layer 11 described in Embodiment 2.

Thus, the first information layer 15 is formed.

Subsequently, the interlayer 6 (with a thickness, for example, of 10 μm) is formed on the second interface layer 503 of the first information layer 15 (on the second dielectric layer 502 in the case of the configuration provided with the second dielectric layer 502). The interlayer 6 can be formed by applying a photocurable resin (particularly, an ultraviolet curable resin) or a slow-acting thermosetting resin onto the second interface layer 503 (or the second dielectric layer 502), performing spin coating, and then curing the resin. In the case where the interlayer 6 is to be provided with guide grooves for the laser beam 1, such guide grooves can be formed by bringing a substrate (mold) formed with grooves into close contact with the resin before curing, thereafter curing the resin, and then separating the substrate (mold) therefrom. Not only the above-mentioned spin coating, but also printing techniques such as screen printing and ink jetting can be used as the method for forming an interlayer, in application to microfabrication technology.

After the formation of the second interface layer 503 or the second dielectric layer 502, or after the formation of the interlayer 6, an initialization process of crystallizing the entire surface of the recording layer 504 may be performed, as needed. The crystallization of the recording layer 504 can be achieved by irradiation with a laser beam.

Subsequently, the second information layer 16 is formed on the interlayer 6. Specifically, the transmittance adjusting layer 609, the reflective layer 608, the first interface layer 605, the recording layer 604 and the second interface layer 603 are first formed on the interlayer 6 in this order. At this time, the first dielectric layer 606 may be formed between the reflective layer 608 and the first interface layer 605, as needed. Further, the second dielectric layer 602 may be formed between the interlayer 5 and the second interface layer 603, as needed. These layers, respectively, can be formed by the same methods as the transmittance adjusting layer 109, the reflective layer 108, the first dielectric layer 106, the first interface layer 105, the recording layer 104, the second interface layer 103 and the second dielectric layer 102 of the N-th information layer 10 described in Embodiment 1.

Thus, the second information layer 16 is formed.

Subsequently, the interlayer 5 (with a thickness, for example, of 20 μm) is formed on the second interface layer 603 of the second information layer 16 (on the second dielectric layer 602 in the case of the configuration provided with the second dielectric layer 602) by the same method as the above-mentioned interlayer 6.

After the formation of the second interface layer 603 or the second dielectric layer 602, or after the formation of the interlayer 5, an initialization process of crystallizing the entire surface of the recording layer 504 and/or the recording layer 604 may be performed, as needed. The crystallization of the recording layer 504 and/or the recording layer 604 can be achieved by irradiation with a laser beam.

Subsequently, the third information layer 17 is formed on the interlayer 5. Specifically, the transmittance adjusting layer 709, the reflective layer 708, the first interface layer 705, the recording layer 704 and the second interface layer 703 are first formed on the interlayer 5 in this order. At this time, the first dielectric layer 706 may be formed between the reflective layer 708 and the first interface layer 705, as needed. Further, the second dielectric layer 702 may be formed between the interlayer 3 and the second interface layer 703, as needed. These layers, respectively, can be formed by the same methods as the transmittance adjusting layer 109, the reflective layer 108, the first dielectric layer 106, the first interface layer 105, the recording layer 104, the second interface layer 103 and the second dielectric layer 102 of the N-th information layer 10 described in Embodiment 1.

Thus, the third information layer 17 is formed.

Subsequently, the interlayer 3 (with a thickness, for example, of 15 μm) is formed on the second interface layer 703 of the third information layer 17 (on the second dielectric layer 702 in the case of the configuration provided with the second dielectric layer 702) by the same method as the above-mentioned interlayer 6.

After the formation of the second interface layer 703 or the second dielectric layer 702, or after the formation of the interlayer 3, an initialization process of crystallizing the entire surface of the recording layer 504, the recording layer 604 and/or the recording layer 704 may be performed, as needed. The crystallization of the recording layer 504, the recording layer 604 and/or the recording layer 704 can be achieved by irradiation with a laser beam.

Subsequently, the fourth information layer 18 is formed on the interlayer 3. Specifically, the transmittance adjusting layer 809, the reflective layer 808, the first interface layer 805, the recording layer 804 and the second interface layer 803 are first formed on the interlayer 3 in this order. At this time, the first dielectric layer 806 may be formed therein between the reflective layer 808 and the first interface layer 805, as needed. The second dielectric layer 802 may be formed therein between the transparent layer 2 and the second interface layer 803, as needed. These layers, respectively, can be formed by the same methods as the transmittance adjusting layer 109, the reflective layer 108, the first dielectric layer 106, the first interface layer 105, the recording layer 104, the second interface layer 103 and the second dielectric layer 102 of the N-th information layer 10 described in Embodiment 1.

Thus, the fourth information layer 18 is formed.

Finally, the transparent layer 2 (with a thickness, for example, of 55 μm) is formed on the second interface layer 803 (on the second dielectric layer 802 in the case of the configuration provided with the second dielectric layer 802). The transparent layer 2 can be formed by the method described in Embodiment 1.

After the formation of the second interface layer 803 or the second dielectric layer 802, or after the formation of the transparent layer 2, an initialization process of crystallizing the entire surface of the recording layer 504, the recording layer 604, the recording layer 704 and/or the recording layer 804 may be performed, as needed. The crystallization of the recording layer 504, the recording layer 604, the recording layer 704 and/or the recording layer 804 can be achieved by irradiation with a laser beam.

Thus, the information recording medium 19 can be produced. In this embodiment, sputtering is used for forming each layer as a film forming method, which, however, is not limited thereto. Vacuum evaporation, ion plating, CVD, or MBE also can be used therefor.

Embodiment 4

In Embodiment 4, a recording/reproduction method for the information recording medium of the present invention described in Embodiments 1, 2 and 3 is described.

Figure 4:
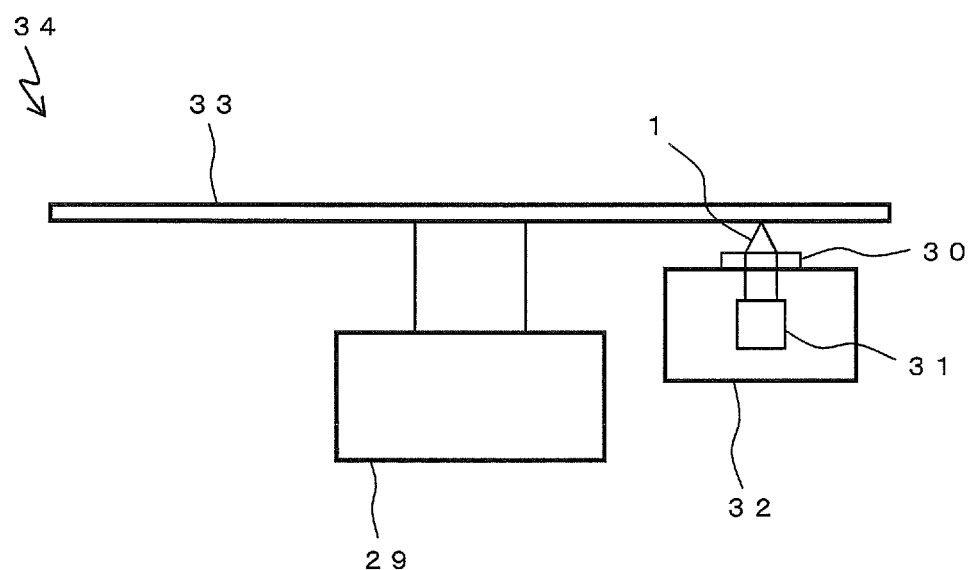
FIG. 4 is a view schematically showing a part of the configuration of an example of a recording/reproducing apparatus to be used for recording/reproducing information with respect to the information recording medium of the present invention.

FIG. 4 schematically shows a part of the configuration of an example of a recording/reproducing apparatus 34 to be used for the recording/reproduction method for the information recording medium of the present invention. The recording/reproducing apparatus 34 shown in FIG. 4 includes a spindle motor 29 for rotating an information recording medium 33 and an optical head 32 provided with a semiconductor laser 31 and an objective lens 30 that focuses the laser beam 1 emitted from the semiconductor laser 31. The information recording medium 33 corresponds to the information recording medium of Embodiments 1 to 3, and includes a plurality of information layers (for example, the first information layer 11, the second information layer 12 and the third information layer 13). The objective lens 30 focuses the laser beam 1 on each of the information layers.

Recording, erasing, and overwriting of information on the information recording medium are performed by modulating the power of the laser beam 1 between a peak power ($P_p$ (mW)) at high power and a bias power ($P_b$ (mW)) at low power. A local part of the recording layer is rendered amorphous by irradiation with the laser beam 1 at a peak power and the amorphous phase serves as a recording mark. Between recording marks, irradiation with the laser beam 1 at a bias power is performed to form a crystalline phase (erased region). For irradiation with the laser beam 1 at the peak power, it is common to use a so-called multi-pulse composed of pulse trains. Such a multi-pulse may be modulated between just two power levels of the peak power and the bias power, or it may be modulated among three power levels or four power levels in the range from 0 mW to the peak power, additionally using a cooling power ($P_c$mW)) and a bottom power ($P_B$ (mW)), which are further lower than the bias power.

The signals from the information recording medium that are obtained by irradiation with the laser beam 1 at a reproducing power are read by a detector, so that information signals are reproduced. The reproducing power ($P_r$ (mW)) is set to a power level such that the power level is lower than those of the peak power and the bias power, irradiation with the laser beam 1 at the power level has no influence on the optical state of recording marks, and a sufficient amount of reflected light for reproducing recording marks can be obtained from the information recording medium.

The numerical aperture NA of the objective lens 30 is preferably within the range of 0.5 to 1.1, more preferably within the range of 0.6 to 0.9, in order to adjust the spot diameter of the laser beam 1 within the range of 0.4 μm to 0.7 μm. The wavelength of the laser beam 1 is preferably not more than 450 nm (more preferably within the range of 350 nm to 450 nm). The linear velocity of the information recording medium in information recording is preferably within the range of 2 m/second to 15 m/second, more preferably within the range of 6 m/second to 10 m/second, in which crystallization due to the reproducing beam is unlikely to occur and sufficient erasing performance can be obtained. Needless to say, the wavelength, the numerical aperture of the objective lens and the linear velocity to be used may vary from the values exemplified herein, depending on the type or the like of the information recording medium. For example, the wavelength of the laser beam 1 may be 650 to 670 nm. Further, an optical system with NA>1 may be used for recording/reproduction. Examples of the optical system to be used include a solid immersion lens (SIL) and a solid immersion mirror (SIM). In this case, the interlayers and the transparent layer may be formed, having a thickness of 5 μm or less.

In the information recording medium 14 provided with three information layers (see FIG. 2), when recording is performed on the first information layer 11, the laser beam 1 is focused on the recording layer 204, and information is recorded on the recording layer 204 with the laser beam 1 that has been transmitted through the transparent layer 2, the third information layer 13, the interlayer 3, the second information layer 12 and the interlayer 5. Reproduction is performed by detecting the laser beam 1 that has been reflected by the recording layer 204 and then transmitted through the interlayer 5, the second information layer 12, the interlayer 3, the third information layer 13 and the transparent layer 2. When recording is performed on the second information layer 12, the laser beam 1 is focused on the recording layer 304, and information is recorded with the laser beam 1 that has been transmitted through the transparent layer 2, the third information layer 13 and the interlayer 3. Reproduction is performed by detecting the laser beam 1 that has been reflected by the recording layer 304 and then transmitted through the interlayer 3, the third information layer 13 and the transparent layer 2. When recording is performed on the third information layer 13, the laser beam 1 is focused on the recording layer 404, and information is recorded with the laser beam 1 that has been transmitted through the transparent layer 2. Reproduction is performed by detecting the laser beam 1 that has been reflected by the recording layer 404 and then transmitted through the transparent layer 2.

In the case where guide grooves for guiding the laser beam 1 are formed on the substrate 8 and the interlayers 3, 5 and 6, information may be recorded on the groove surfaces (grooves) closer to the laser beam 1 incident side, or it may be recorded on the groove surfaces (lands) farther therefrom. Information may be recorded in both the grooves and lands. In this case, it is preferable that information be recorded only on the grooves.

The performance of the information recording medium can be evaluated, as described below, using this recording/reproducing apparatus. The signal intensity can be evaluated as follows. The power of the laser beam 1 is modulated between 0 to $P_p$ (mW), a signal with a mark length of 0.168 μm (3T) and a signal with a mark length of 0.446 μm (8T) are alternately recorded on the same groove ten consecutive times, and it is finally overwritten by a 3T signal. The ratio (CNR: carrier-to-noise ratio) of the signal amplitude (carrier level) to the noise amplitude (noise level) is determined at the frequency of the 3T signal, using a spectrum analyzer. The higher the CNR, the higher the signal intensity.

Further, the erasing performance can be evaluated as follows. The power of the laser beam 1 is modulated between 0 to $P_p$ (mW), and a signal with a mark length of 0.168 μm (3T) and a signal with a mark length of 0.446 μm (8T) are alternately recorded on the same groove ten consecutive times. Then, the recorded signal is overwritten by a 3T signal at the eleventh time, and thereafter it is further overwritten by an 8T signal. The difference between the signal amplitude of the 3T signal at the eleventh overwriting and the signal amplitude of the 3T signal after being further overwritten by the 8T signal is determined using a spectrum analyzer, which is taken as the erasure rate of the 3T signal. The higher the erasure rate, the better the erasing performance.

$P_p$, $P_b$, $P_c$, and $P_B$ are determined so that the signal amplitude and the erasure rate should be highest.

Embodiment 5

As Embodiment 5, an embodiment of a sputtering target to be used for forming the second interface layer and the first interface layer of the present invention is described below.

The sputtering target to be used for forming the second interface layer of this embodiment contains M1 and Cr. The sputtering target to be used for forming the first interface layer of this embodiment contains M2 and Cr. The second interface layer that contains M1, Cr and O and the first interface layer that contains M2, Cr and O can be formed using these sputtering targets by introducing a rare gas and a reactive gas (in particular, $O_2$ gas). Furthermore, it also possible to use the above-mentioned sputtering targets each of which further contains O. The use of such sputtering targets allows the second interface layer and the first interface layer to be formed by introducing only a rare gas, or a mixed gas of a rare gas and a slight amount of a reactive gas (in particular, $O_2$ gas).

Further, it is possible to suppress, for example, individual variations in reflectance or medium-in-plane variations in jitter of information recording media to a low level in high-speed film formation. In order to achieve higher-speed film formation and less variations, these sputtering targets preferably have a high density (which means a filling rate of powder: the state filled with the powder without any void is defined as 100%). The density is preferably at least 80%, more preferably at least 90%.

Next, an example of the method for producing a sputtering target of this embodiment is described.

For example, a method for producing a sputtering target that contains M1 and Cr is described. Powders of high purity materials M1 and Cr each having a specific particle size are prepared. These are weighed and mixed at a specific mixing ratio, and then placed into a hot pressing apparatus. The hot pressing apparatus is evacuated, as needed, and maintained under specific conditions of high pressure and high temperature for a specific time, so that the mixed powder is sintered. Sufficient mixing allows a uniform composition in the in-plane/thickness directions of the sputtering target. Further, the optimization of the conditions of pressure, temperature and time leads to an improvement in filling property, thus making it possible to produce a sputtering target with high density. Thus, a sputtering target that contains M1 and Cr at a specific composition ratio is completed. After the sintering, the sputtering target may be bonded to, for example, a copper plate with a smooth surface, using a solder such as In, as needed. In this case, sputtering can be performed with the sputtering target being fixed on the sputtering apparatus.

Similarly, a sputtering target that contains M2 and Cr also can be produced in the same manner as described above by preparing powders of high purity materials M2 and Cr each having a specific particle size.

Alternatively, when the above-mentioned sputtering target is produced, powders of high purity materials M1-Cr and M2-Cr each having a specific particle size may be prepared. The sputtering target can be produced with any combination of the powders.

Similarly, in the case where the sputtering target to be produced contains O, a sputtering target can be produced in the same manner as described above by preparing powders of high purity materials M1-O, M2-O and Cr—O each having a specific particle size.

As a method for producing the second interface layer and the first interface layer, it is desirable to form a film by sputtering using the above-mentioned sputtering targets. The use of sputtering is advantageous in that film forming apparatuses for stacking a plurality of films for mass production have already been available on the market and therefore a thin film with good film quality can be obtained comparatively easily.

Figure 5:
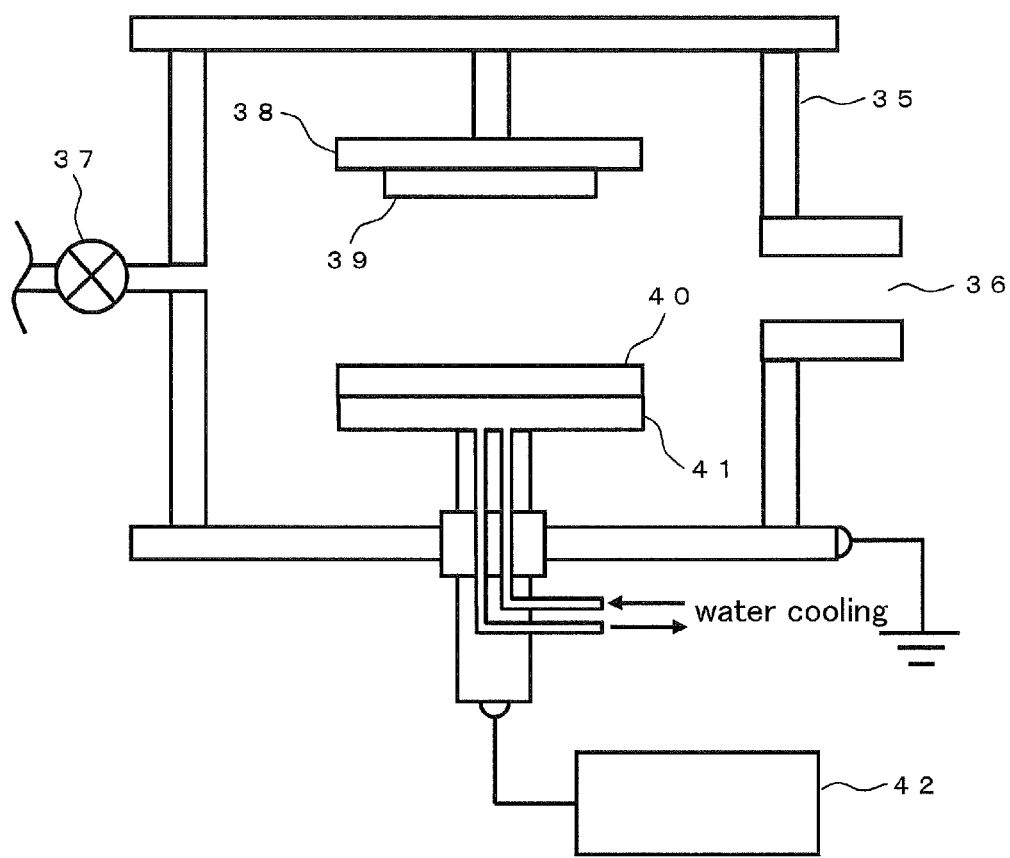
FIG. 5 is a view schematically showing a part of the configuration of an example of a sputtering apparatus to be used for producing the information recording medium of the present invention.

An example of the sputtering apparatus to be used in this embodiment is described herein. FIG. 5 shows an illustration of film formation using the sputtering apparatus. As shown in FIG. 5, a vacuum pump (not shown) is connected to a vacuum container 35 through a discharge port 36 so that high vacuum can be maintained inside the vacuum container 35 in this sputtering apparatus. A gas supply port 37 is configured to supply a gas at a constant flow rate. A substrate 39 (the substrate herein means a base on which films are deposited) is attached to an anode 38. The vacuum container 35 is grounded, so that the vacuum container 35 and the substrate 39 are kept positive. A sputtering target 40 is connected to a cathode 41, and is connected to a power source 42 via a switch (not shown). When a specific voltage is applied between the anode 38 and the cathode 41, particles are released from the sputtering target 40, thereby forming a thin film on the substrate 39.

EXAMPLES

The present invention is described further in detail with reference to examples.

Example 1

In Example 1, the information recording medium 14 of FIG. 2 was produced, and the relations of the material of each of the first interface layer 405 and the second interface layer 403 of the third information layer 13, the refractive index and the extinction coefficient of each of the first interface layer 405 and the second interface layer 403, the reflectance ratio $R_{c3}/R_{a3}$ of the third information layer 13, the transmittance $T_{c3}$ of the third information layer 13, the CNR of the third information layer 13, the erasure rate of the third information layer 13 and the moisture resistance of the third information layer 13 were investigated. Specifically, Samples 1-1 to 1-6, Samples 2-1 to 2-6, Samples 3-1 to 3-6, Samples 4-1 to 4-6, Samples 5-1 to 5-6, Samples 6-1 to 6-6 and Samples 7-1 to 7-3 of the information recording medium 14 each including the third information layer 13 in which the materials of the first interface layer 405 and the second interface layer 403 were different from the others were produced. Then the refractive index and the extinction coefficient of each of the first interface layer 405 and the second interface layer 403, the reflectance ratio $R_{c3}/R_{a3}$ of the third information layer 13, the transmittance $T_{c3}$ of the third information layer 13, the CNR of the third information layer 13, the erasure rate of the third information layer 13 and the moisture resistance of the third information layer 13 were determined, for each sample.

Each sample was produced as follows. First, a polycarbonate substrate (with a diameter of 120 mm and a thickness of 1.1 mm) formed with guide grooves (with a depth of 20 nm and a track pitch of 0.32 μm) for guiding the laser beam 1 was prepared as the substrate 8. Then, the first information layer 11 was stacked on the polycarbonate substrate. An Ag—Pd—Cu layer (with a thickness of 100 nm) to serve as the reflective layer 208, an $(SiO_2)_{25}$ $(In_2O_3)_{50}$ $(ZrO_2)_{25}$ layer (with a thickness of 10 nm) to serve as the first dielectric layer 206, a $(Cr_2O_3)_{50}$ $(ZrO_2)_{50}$ layer (with a thickness of 5 nm) to serve as the first interface layer 205, a $Ge_{45}Sb_4Te_{51}$ layer (with a thickness of 11 nm) to serve as the recording layer 204, a $(Cr_2O_3)_{50}$ $(ZrO_2)_{50}$ layer (with a thickness of 5 nm) to serve as the second interface layer 203 and a $(ZnS)_{80}$ $(SiO_2)_{20}$ layer (with a thickness of 60 nm) to serve as the second dielectric layer 202 were sequentially stacked by sputtering.

The film forming apparatus for sputtering the above-mentioned layers was provided respectively with an Ag—Pd—Cu alloy sputtering target to form the reflective layer 208, an $(SiO_2)_{25}$ $(In_2O_3)_{50}$ $(ZrO_2)_{25}$ sputtering target to form the first dielectric layer 206, a $(Cr_2O_3)_{50}$ $(ZrO_2)_{50}$ sputtering target to form the first interface layer 205, a Ge—Sb—Te alloy sputtering target to form the recording layer 204, a $(Cr_2O_3)_{50}$ $(ZrO_2)_{50}$ sputtering target to form the second interface layer 203 and a $(ZnS)_{80}$ $(SiO_2)_{20}$ sputtering target to form the second dielectric layer 202. All the sputtering targets had a diameter of 200 mm and a thickness of 6 mm in form.

The reflective layer 208 was formed in an Ar gas atmosphere at a pressure of 0.2 Pa, using a DC power source with an input power of 2000 W. The first dielectric layer 206 was formed in an Ar gas atmosphere at a pressure of 0.13 Pa, using an RF power source with an input power of 2000 W. The first interface layer 205 was formed in an Ar gas atmosphere at a pressure of 0.13 Pa, using an RF power source with an input power of 3000 W. The recording layer 204 was formed in an Ar gas atmosphere at a pressure of 0.13 Pa, using a pulsed DC power source with an input power of 200 W. The second interface layer 203 was formed in an Ar gas atmosphere at a pressure of 0.13 Pa, using an RF power source with an input power of 3000 W. The second dielectric layer 202 was formed in an Ar gas atmosphere at a pressure of 0.13 Pa, using an RF power source with an input power of 2500 W.

Next, an ultraviolet curable acrylic resin was applied onto the second dielectric layer 202, and a substrate formed with guide grooves (with a depth of 20 nm and a track pitch of 0.32 μm) was placed on it and brought into close contact therewith. Then, it was rotated, thereby allowing a uniform resin layer to be formed. After curing the resin, the substrate was separated therefrom. As a result, the interlayer 5 with a thickness of 25 μm on the surface of which guide grooves for guiding the laser beam 1 were formed on the side of the second information layer 12 was obtained.

Thereafter, the second information layer 12 was stacked on the interlayer 5. A $(TiO_2)_{60}$ $(Bi_2O_3)_{40}$ layer (with a thickness of 20 nm) to serve as the transmittance adjusting layer 309, an Ag—Pd—Cu layer (with a thickness of 9 nm) to serve as the reflective layer 308, an $Al_2O_3$ layer (with a thickness of 10 nm) to serve as the first dielectric layer 306, a $(Cr_2O_3)_{40}$ $(Al_2O_3)_{60}$ layer (with a thickness of 5 nm) to serve as the first interface layer 305, a $Ge_{45}Sb_3In_1Te_{51}$ layer (with a thickness of 7 nm) to serve as the recording layer 304, a $(Cr_2O_3)_{30}$ $(Al_2O_3)_{70}$ layer (with a thickness of 5 nm) to serve as the second interface layer 303 and a $(ZnS)_{80}$ $(SiO_2)_{20}$ layer (with a thickness of 40 nm) to serve as the second dielectric layer 302 were sequentially stacked by sputtering.

The film forming apparatus for sputtering the above-mentioned layers was provided respectively with a $(TiO_2)_{60}$ $(BiO_3)_{40}$ sputtering target to form the transmittance adjusting layer 309, an Ag—Pd—Cu alloy sputtering target to form the reflective layer 308, an $Al_2O_3$ sputtering target to form the first dielectric layer 306, a $(Cr_2O_3)_{40}$ $(Al_2O_3)_{60}$ sputtering target to form the first interface layer 305, a Ge—Sb—In—Te alloy sputtering target to form the recording layer 304, a $(Cr_2O_3)_{30}$ $(Al_2O_3)_{70}$ sputtering target to form the second interface layer 303 and a $(ZnS)_{80}$ $(SiO_2)_{20}$ sputtering target to form the first dielectric layer 302. All the sputtering targets had a diameter of 200 mm and a thickness of 6 mm in form.

The transmittance adjusting layer 309 was formed in an atmosphere of a mixed gas of Ar and $O_2$ (3% $O_2$ gas with respect to the whole) at a pressure of 0.13 Pa, using a pulsed DC power source with an input power of 2000 W. The reflective layer 308 was formed in an Ar gas atmosphere at a pressure of 0.2 Pa, using a DC power source with an input power of 200 W. The first dielectric layer 306 was formed in an Ar gas atmosphere at a pressure of 0.13 Pa, using an RF power source with an input power of 2000 W. The first interface layer 305 was formed in an Ar gas atmosphere at a pressure of 0.13 Pa, using an RF power source with an input power of 3000 W. The recording layer 304 was formed in an Ar gas atmosphere at a pressure of 0.13 Pa, using a pulsed DC power source with an input power of 200 W. The second interface layer 303 was formed in an Ar gas atmosphere at a pressure of 0.13 Pa, using an RF power source with an input power of 3000 W. The second dielectric layer 302 was formed in an Ar gas atmosphere at a pressure of 0.13 Pa, using an RF power source with an input power of 2500 W.

Next, an ultraviolet curable acrylic resin was applied onto the second dielectric layer 302, and a substrate formed with guide grooves (with a depth of 20 nm and a track pitch of 0.32 μm) was placed on it and brought into close contact therewith. Then, it was rotated, thereby allowing a uniform resin layer to be formed. After curing the resin, the substrate was separated therefrom. As a result, the interlayer 3 with a thickness of 18 μm on the surface of which guide grooves for guiding the laser beam 1 were formed on the side of the third information layer 13 was obtained.

Thereafter, the third information layer 13 was stacked on the interlayer 3. A $(TiO_2)_{60}$ $(Bi_2O_3)_{40}$ layer (with a thickness of 15 nm) to serve as the transmittance adjusting layer 409, an Ag—Pd—Cu layer (with a thickness of 8 nm) to serve as the reflective layer 408, an $Al_2O_3$ layer (with a thickness of 6 nm) to serve as the first dielectric layer 406, the first interface layer 405 (with a thickness of 5 nm), a $Ge_{45}In_1Bi_3Te_{51}$ layer (with a thickness of 6 nm) to serve as the recording layer 404, the second interface layer 403 (with a thickness of 5 nm), and a $(ZnS)_{80}$ $(SiO_2)_{20}$ layer (with a thickness of 35 nm) to serve as the second dielectric layer 402 were sequentially stacked by sputtering.

The film forming apparatus for sputtering the above-mentioned layers was provided respectively with a $(TiO_2)_{60}$ $(Bi_2O_3)_{40}$ sputtering target to form the transmittance adjusting layer 409, an Ag—Pd—Cu alloy sputtering target to form the reflective layer 408, an $Al_2O_3$ sputtering target to form the first dielectric layer 406, a sputtering target to form the first interface layer 405, a Ge—In—Bi—Te alloy sputtering target to form the recording layer 404, a sputtering target to form the second interface layer 403 and a $(ZnS)_{80}$ $(SiO_2)_{20}$ sputtering target to form the second dielectric layer 402. All the sputtering targets had a diameter of 200 mm and a thickness of 6 mm in form.

The transmittance adjusting layer 409 was formed in an atmosphere of a mixed gas of Ar and $O_2$ (1% $O_2$ gas with respect to the whole) at a pressure of 0.13 Pa, using an RF power source with an input power of 2000 W. The reflective layer 408 was formed in an Ar gas atmosphere at a pressure of 0.2 Pa, using a DC power source with an input power of 200 W. The first dielectric layer 406 was formed in an Ar gas atmosphere at a pressure of 0.13 Pa, using an RF power source with an input power of 2000 W. The first interface layer 405 was formed in an Ar gas atmosphere at a pressure of 0.13 Pa, using an RF power source with an input power of 3000 W. The recording layer 404 was formed in an Ar gas atmosphere at a pressure of 0.13 Pa, using a pulsed DC power source with an input power of 200 W. The second interface layer 403 was formed in an Ar gas atmosphere at a pressure of 0.13 Pa, using an RF power source with an input power of 3000 W. The second dielectric layer 402 was formed in an Ar gas atmosphere at a pressure of 0.13 Pa, using an RF power source with an input power of 2500 W.

Finally, an ultraviolet curable acrylic resin was applied onto the second dielectric layer 402, which was rotated, so that a uniform resin layer was formed. Then, the resin was cured by irradiation with ultraviolet rays. Thus, the transparent layer 2 with a thickness of 57 μm was formed. Thereafter, an initialization process was performed to crystallize the recording layer 204, the recording layer 304 and the recording layer 404 with a laser beam. As described above, a plurality of samples in each of which the materials of the first interface layer 405 and the second interface layer 403 were different from the others were produced.

Samples for the measurement of the refractive index and the extinction coefficient of each of the first interface layer 405 and the second interface layer 403 were prepared as follows. A quartz substrate for the measurement of the refractive index and the extinction coefficient (with a length of 12 mm, a width of 18 mm and a thickness of 1.1 mm) was laminated to a polycarbonate substrate. Then, on the polycarbonate substrate to which the quartz substrate had been laminated, a material to form the first interface layer 405 or the second interface layer 403 was deposited as a film with a thickness of about 20 nm by sputtering. An ellipsometer was used for the measurement of the refractive index and the extinction coefficient.

For each sample thus obtained, the reflectance of the first information layer 11, the second information layer 12 and the third information layer 13 of the information recording medium 14 was measured using the recording/reproducing apparatus 34 of FIG. 4. At this time, the wavelength of the laser beam 1 was set to 405 nm, the numerical aperture NA of the objective lens 30 was set to 0.85, the linear velocity of the sample in the measurement was set to 7.4 m/s, and the reproducing power was set to 1.0 mW. Further, the reflectance was measured on the grooves.

The transmittance ($T_{c3}$) of the third information layer 13 was obtained by calculation of ($R_{c2}=R_{c0} \times T_{c3} \times T_{c3}$) from the reflectance ($R_{c0}$) that had been measured in advance for the sample in which only the second information layer 12 was formed and the reflectance ($R_{c2}$) of the second information layer 12 of each of Samples 1-1 to 1-6, Samples 2-1 to 2-6, Samples 3-1 to 3-6, Samples 4-1 to 4-6, Samples 5-1 to 5-6, Samples 6-1 to 6-6 and Samples 7-1 to 7-3.

Further, the length of recording marks was set to 0.168 μm (3T) and 0.446 μm (8T) in the measurement of the CNR and the erasure rate of the third information layer 13.

Furthermore, the moisture resistance of the third information layer 13 was determined by conducting an accelerated test on the produced samples under conditions of a temperature of 85° C. and a relative humidity of 85% RH and observing the state after the test using an optical microscope.

For each sample, the material of the first interface layer 405 and the material of the second interface layer 403 are shown in Table 1-1, Table 2-1, Table 3-1, Table 4-1, Table 5-1, Table 6-1 and Table 7-1. Further, for each sample, the refractive index and the extinction coefficient of the first interface layer 405, the refractive index and the extinction coefficient of the second interface layer 403, the reflectance ratio $R_{c3}/R_{a3}$ of the third information layer 13, the transmittance $T_{c3}$ of the third information layer 13, the CNR of the third information layer 13, the erasure rate of the third information layer 13, the moisture resistance of the third information layer 13 and the comprehensive evaluation are shown in Table 1-2, Table 2-2, Table 3-2, Table 4-2, Table 5-2, Table 6-2 and Table 7-2. With regard to the moisture resistance, the cases where no corrosion/separation occurred after 200-hour acceleration were evaluated as ○, the cases where corrosion/separation occurred after 200-hour acceleration though did not occur after 100-hour acceleration were evaluated as Δ, and the cases where corrosion/separation occurred after 100-hour acceleration were evaluated as x, under conditions of a temperature of 85° C. and a relative humidity of 85% RH. With regard to the comprehensive evaluation, the cases where all the conditions of the transmittance of at least 50%, the CNR of at least 50 dB, and the moisture resistance of Δ or ○ were satisfied was evaluated as ○, and the cases where any one of the conditions of the transmittance of less than 50%, the CNR of less than 50 dB, and the moisture resistance of x was satisfied was evaluated as x.

TABLE 1-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 1-1 | 2.51 | 0.01 | 2.51 | 0.01 | 6.4 | 56.1 | 50.6 | 27.4 | x | x |
| 1-2 | 2.52 | 0.01 | 2.52 | 0.01 | 6.3 | 56.1 | 50.5 | 28.5 | Δ | ○ |
| 1-3 | 2.53 | 0.02 | 2.53 | 0.02 | 6.3 | 56.0 | 50.4 | 29.2 | ○ | ○ |
| 1-4 | 2.57 | 0.04 | 2.57 | 0.04 | 6.2 | 55.7 | 50.3 | 30.7 | ○ | ○ |
| 1-5 | 2.61 | 0.07 | 2.61 | 0.07 | 6.1 | 55.4 | 50.1 | 31.3 | ○ | ○ |
| 1-6 | 2.62 | 0.12 | 2.62 | 0.12 | 5.7 | 54.7 | 49.6 | 32.5 | ○ | x |

TABLE 1-1

| Sample No. | Material for first interface layer 405 (mol %) | Respective elements in terms of atom % | Material for second interface layer 403 (mol %) | Respective elements in terms of atom % |
|---|---|---|---|---|
| 1-1 | $Nb_2O_5$ | $Nb_{28.6}O_{71.4}$ | $Nb_2O_5$ | $Nb_{28.6}O_{71.4}$ |
| 1-2 | $(Nb_2O_5)_{95}(Cr_2O_3)_5$ | $Nb_{27.5}Cr_{1.4}O_{71.1}$ | $(Nb_2O_5)_{95}(Cr_2O_3)_5$ | $Nb_{27.5}Cr_{1.4}O_{71.1}$ |

TABLE 1-1-continued

| Sample No. | Material for first interface layer 405 (mol %) | Respective elements in terms of atom % | Material for second interface layer 403 (mol %) | Respective elements in terms of atom % |
|---|---|---|---|---|
| 1-3 | $(Nb_2O_5)_{90}(Cr_2O_3)_{10}$ | $Nb_{26.5}Cr_{2.9}O_{70.6}$ | $(Nb_2O_5)_{90}(Cr_2O_3)_{10}$ | $Nb_{26.5}Cr_{2.9}O_{70.6}$ |
| 1-4 | $(Nb_2O_5)_{70}(Cr_2O_3)_{30}$ | $Nb_{21.9}Cr_{9.4}O_{68.7}$ | $(Nb_2O_5)_{70}(Cr_2O_3)_{30}$ | $Nb_{21.9}Cr_{9.4}O_{68.7}$ |
| 1-5 | $(Nb_2O_5)_{50}(Cr_2O_3)_{50}$ | $Nb_{16.7}Cr_{16.7}O_{66.6}$ | $(Nb_2O_5)_{50}(Cr_2O_3)_{50}$ | $Nb_{16.7}Cr_{16.7}O_{66.6}$ |
| 1-6 | $(Nb_2O_5)_{40}(Cr_2O_3)_{60}$ | $Nb_{13.8}Cr_{20.7}O_{65.5}$ | $(Nb_2O_5)_{40}(Cr_2O_3)_{60}$ | $Nb_{13.8}Cr_{20.7}O_{65.5}$ |

TABLE 2-1

| Sample No. | Material for first interface layer 405 (mol %) | Respective elements in terms of atom % | Material for second interface layer 403 (mol %) | Respective elements in terms of atom % |
|---|---|---|---|---|
| 2-1 | $Y_2O_3$ | $Y_{40.0}O_{60.0}$ | $Y_2O_3$ | $Y_{40.0}O_{60.0}$ |
| 2-2 | $(Y_2O_3)_{95}(Cr_2O_3)_5$ | $Y_{38.0}Cr_{2.0}O_{60.0}$ | $(Y_2O_3)_{95}(Cr_2O_3)_5$ | $Y_{36.0}Cr_{4.0}O_{60.0}$ |
| 2-3 | $(Y_2O_3)_{90}(Cr_2O_3)_{10}$ | $Y_{36.0}Cr_{4.0}O_{60.0}$ | $(Y_2O_3)_{90}(Cr_2O_3)_{10}$ | $Y_{36.0}Cr_{4.0}O_{60.0}$ |
| 2-4 | $(Y_2O_3)_{70}(Cr_2O_3)_{30}$ | $Y_{28.0}Cr_{12.0}O_{60.0}$ | $(Y_2O_3)_{70}(Cr_2O_3)_{30}$ | $Y_{28.0}Cr_{12.0}O_{60.0}$ |
| 2-5 | $(Y_2O_3)_{50}(Cr_2O_3)_{50}$ | $Y_{20.0}Cr_{20.0}O_{60.0}$ | $(Y_2O_3)_{50}(Cr_2O_3)_{50}$ | $Y_{20.0}Cr_{20.0}O_{60.0}$ |
| 2-6 | $(Y_2O_3)_{40}(Cr_2O_3)_{60}$ | $Y_{16.0}Cr_{24.0}O_{60.0}$ | $(Y_2O_3)_{40}(Cr_2O_3)_{60}$ | $Y_{16.0}Cr_{24.0}O_{60.0}$ |

TABLE 2-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 2-1 | 1.94 | 0.01 | 1.94 | 0.01 | 6.6 | 55.5 | 50.8 | 26.1 | x | x |
| 2-2 | 1.98 | 0.01 | 1.98 | 0.01 | 6.5 | 55.5 | 50.7 | 27.4 | Δ | ○ |
| 2-3 | 2.02 | 0.02 | 2.02 | 0.02 | 6.5 | 55.5 | 50.7 | 28.5 | ○ | ○ |
| 2-4 | 2.17 | 0.03 | 2.17 | 0.03 | 6.4 | 55.5 | 50.6 | 29.9 | ○ | ○ |
| 2-5 | 2.32 | 0.07 | 2.32 | 0.07 | 6.1 | 55.1 | 50.1 | 30.4 | ○ | ○ |
| 2-6 | 2.40 | 0.11 | 2.40 | 0.11 | 5.8 | 54.7 | 49.7 | 31.0 | ○ | x |

TABLE 3-1

| Sample No. | Material for first interface layer 405 (mol %) | Respective elements in terms of atom % | Material for second interface layer 403 (mol %) | Respective elements in terms of atom % |
|---|---|---|---|---|
| 3-1 | $Dy_2O_3$ | $Dy_{40.0}O_{60.0}$ | $Dy_2O_3$ | $Dy_{40.0}O_{60.0}$ |
| 3-2 | $(Dy_2O_3)_{95}(Cr_2O_3)_5$ | $Dy_{38.0}Cr_{2.0}O_{60.0}$ | $(Dy_2O_3)_{95}(Cr_2O_3)_5$ | $Dy_{38.0}Cr_{2.0}O_{60.0}$ |
| 3-3 | $(Dy_2O_3)_{90}(Cr_2O_3)_{10}$ | $Dy_{36.0}Cr_{4.0}O_{60.0}$ | $(Dy_2O_3)_{90}(Cr_2O_3)_{10}$ | $Dy_{36.0}Cr_{4.0}O_{60.0}$ |
| 3-4 | $(Dy_2O_3)_{70}(Cr_2O_3)_{30}$ | $Dy_{28.0}Cr_{12.0}O_{60.0}$ | $(Dy_2O_3)_{70}(Cr_2O_3)_{30}$ | $Dy_{28.0}Cr_{12.0}O_{60.0}$ |
| 3-5 | $(Dy_2O_3)_{50}(Cr_2O_3)_{50}$ | $Dy_{20.0}Cr_{20.0}O_{60.0}$ | $(Dy_2O_3)_{50}(Cr_2O_3)_{50}$ | $Dy_{20.0}Cr_{20.0}O_{60.0}$ |
| 3-6 | $(Dy_2O_3)_{40}(Cr_2O_3)_{60}$ | $Dy_{16.0}Cr_{24.0}O_{60.0}$ | $(Dy_2O_3)_{40}(Cr_2O_3)_{60}$ | $Dy_{16.0}Cr_{24.0}O_{60.0}$ |

TABLE 3-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 3-1 | 2.04 | 0.01 | 2.04 | 0.01 | 6.6 | 55.7 | 50.8 | 25.3 | x | x |
| 3-2 | 2.07 | 0.01 | 2.07 | 0.01 | 6.5 | 55.6 | 50.7 | 26.4 | Δ | ○ |
| 3-3 | 2.11 | 0.02 | 2.11 | 0.02 | 6.5 | 55.6 | 50.7 | 27.7 | ○ | ○ |
| 3-4 | 2.24 | 0.03 | 2.24 | 0.03 | 6.4 | 55.6 | 50.6 | 29.2 | ○ | ○ |

TABLE 3-2-continued

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 3-5 | 2.37 | 0.08 | 2.37 | 0.08 | 6.1 | 55.0 | 50.1 | 30.1 | ○ | ○ |
| 3-6 | 2.44 | 0.12 | 2.44 | 0.12 | 5.7 | 54.6 | 49.6 | 30.8 | ○ | x |

TABLE 4-1

| Sample No. | Material for first interface layer 405 (mol %) | Respective elements in terms of atom % | Material for second interface layer 403 (mol %) | Respective elements in terms of atom % |
|---|---|---|---|---|
| 4-1 | $Al_2O_3$ | $Al_{40.0}O_{60.0}$ | $Al_2O_3$ | $Al_{40.0}O_{60.0}$ |
| 4-2 | $(Al_2O_3)_{95}(Cr_2O_3)_5$ | $Al_{38.0}Cr_{2.0}O_{60.0}$ | $(Al_2O_3)_{95}(Cr_2O_3)_5$ | $Al_{38.0}Cr_{2.0}O_{60.0}$ |
| 4-3 | $(Al_2O_3)_{90}(Cr_2O_3)_{10}$ | $Al_{36.0}Cr_{4.0}O_{60.0}$ | $(Al_2O_3)_{90}(Cr_2O_3)_{10}$ | $Al_{36.0}Cr_{4.0}O_{60.0}$ |
| 4-4 | $(Al_2O_3)_{70}(Cr_2O_3)_{30}$ | $Al_{28.0}Cr_{12.0}O_{60.0}$ | $(Al_2O_3)_{70}(Cr_2O_3)_{30}$ | $Al_{28.0}Cr_{12.0}O_{60.0}$ |
| 4-5 | $(Al_2O_3)_{50}(Cr_2O_3)_{50}$ | $Al_{20.0}Cr_{20.0}O_{60.0}$ | $(Al_2O_3)_{50}(Cr_2O_3)_{50}$ | $Al_{20.0}Cr_{20.0}O_{60.0}$ |
| 4-6 | $(Al_2O_3)_{40}(Cr_2O_3)_{60}$ | $Al_{16.0}Cr_{24.0}O_{60.0}$ | $(Al_2O_3)_{40}(Cr_2O_3)_{60}$ | $Al_{16.0}Cr_{24.0}O_{60.0}$ |

TABLE 4-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 4-1 | 1.66 | 0.00 | 1.66 | 0.00 | 6.7 | 55.5 | 51.0 | 28.2 | x | x |
| 4-2 | 1.71 | 0.01 | 1.71 | 0.01 | 6.7 | 55.5 | 51.0 | 29.3 | Δ | ○ |
| 4-3 | 1.76 | 0.01 | 1.76 | 0.01 | 6.7 | 55.5 | 51.0 | 30.0 | ○ | ○ |
| 4-4 | 1.97 | 0.03 | 1.97 | 0.03 | 6.5 | 55.3 | 50.7 | 30.8 | ○ | ○ |
| 4-5 | 2.18 | 0.06 | 2.18 | 0.06 | 6.3 | 55.2 | 50.4 | 31.4 | ○ | ○ |
| 4-6 | 2.28 | 0.11 | 2.28 | 0.11 | 5.9 | 54.6 | 49.8 | 32.9 | ○ | x |

TABLE 5-1

| Sample No. | Material for first interface layer 405 (mol %) | Respective elements in terms of atom % | Material for second interface layer 403 (mol %) | Respective elements in terms of atom % |
|---|---|---|---|---|
| 5-1 | $TiO_2$ | $Ti_{33.3}O_{66.7}$ | $TiO_2$ | $Ti_{33.3}O_{66.7}$ |
| 5-2 | $(TiO_2)_{95}(Cr_2O_3)_5$ | $Ti_{30.6}Cr_{3.2}O_{66.2}$ | $(TiO_2)_{95}(Cr_2O_3)_5$ | $Ti_{30.6}Cr_{3.2}O_{66.2}$ |
| 5-3 | $(TiO_2)_{90}(Cr_2O_3)_{10}$ | $Ti_{28.1}Cr_{6.3}O_{65.6}$ | $(TiO_2)_{90}(Cr_2O_3)_{10}$ | $Ti_{28.1}Cr_{6.3}O_{65.6}$ |
| 5-4 | $(TiO_2)_{70}(Cr_2O_3)_{30}$ | $Ti_{19.4}Cr_{16.7}O_{63.9}$ | $(TiO_2)_{70}(Cr_2O_3)_{30}$ | $Ti_{19.4}Cr_{16.7}O_{63.9}$ |
| 5-5 | $(TiO_2)_{50}(Cr_2O_3)_{50}$ | $Ti_{12.5}Cr_{25.0}O_{62.5}$ | $(TiO_2)_{50}(Cr_2O_3)_{50}$ | $Ti_{12.5}Cr_{25.0}O_{62.5}$ |
| 5-6 | $(TiO_2)_{40}(Cr_2O_3)_{60}$ | $Ti_{9.5}Cr_{28.6}O_{61.9}$ | $(TiO_2)_{40}(Cr_2O_3)_{60}$ | $Ti_{9.5}Cr_{28.6}O_{61.9}$ |

TABLE 5-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 5-1 | 2.68 | 0.01 | 2.68 | 0.01 | 6.3 | 56.3 | 50.4 | 27.7 | x | x |
| 5-2 | 2.68 | 0.01 | 2.68 | 0.01 | 6.3 | 56.3 | 50.4 | 28.6 | Δ | ○ |
| 5-3 | 2.68 | 0.02 | 2.68 | 0.02 | 6.3 | 56.2 | 50.4 | 29.4 | ○ | ○ |
| 5-4 | 2.69 | 0.04 | 2.69 | 0.04 | 6.2 | 55.9 | 50.3 | 30.9 | ○ | ○ |
| 5-5 | 2.69 | 0.07 | 2.69 | 0.07 | 6.1 | 55.4 | 50.1 | 31.6 | ○ | ○ |
| 5-6 | 2.69 | 0.12 | 2.69 | 0.12 | 5.7 | 54.7 | 49.6 | 32.8 | ○ | x |

TABLE 6-1

| Sample No. | Material for first interface layer 405 (mol %) | Respective elements in terms of atom % | Material for second interface layer 403 (mol %) | Respective elements in terms of atom % |
|---|---|---|---|---|
| 6-1 | $Al_6Si_2O_{13}$ | $Al_{28.6}Si_{9.5}O_{61.9}$ | $Al_2TiO_5$ | $Al_{25.0}Ti_{12.5}O_{62.5}$ |
| 6-2 | $(Al_6Si_2O_{13})_{95}(Cr_2O_3)_5$ | $Al_{28.2}Si_{9.4}Cr_{0.5}O_{61.9}$ | $(Al_2TiO_5)_{95}(Cr_2O_3)_5$ | $Al_{24.2}Ti_{12.1}Cr_{1.3}O_{62.4}$ |
| 6-3 | $(Al_6Si_2O_{13})_{90}(Cr_2O_3)_{10}$ | $Al_{27.8}Si_{9.3}Cr_{1.0}O_{61.9}$ | $(Al_2TiO_5)_{90}(Cr_2O_3)_{10}$ | $Al_{23.4}Ti_{11.7}Cr_{2.6}O_{62.3}$ |
| 6-4 | $(Al_6Si_2O_{13})_{70}(Cr_2O_3)_{30}$ | $Al_{25.9}Si_{8.6}Cr_{3.7}O_{61.8}$ | $(Al_2TiO_5)_{70}(Cr_2O_3)_{30}$ | $Al_{19.7}Ti_{9.9}Cr_{8.5}O_{61.9}$ |
| 6-5 | $(Al_6Si_2O_{13})_{50}(Cr_2O_3)_{50}$ | $Al_{23.1}Si_{7.7}Cr_{7.7}O_{61.5}$ | $(Al_2TiO_5)_{50}(Cr_2O_3)_{50}$ | $Al_{15.4}Ti_{7.7}Cr_{15.4}O_{61.5}$ |
| 6-6 | $(Al_6Si_2O_{13})_{40}(Cr_2O_3)_{60}$ | $Al_{21.1}Si_{7.0}Cr_{10.5}O_{61.4}$ | $(Al_2TiO_5)_{40}(Cr_2O_3)_{60}$ | $Al_{12.9}Ti_{6.5}Cr_{19.4}O_{61.5}$ |

TABLE 6-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 6-1 | 1.59 | 0.00 | 2.17 | 0.01 | 6.9 | 55.3 | 51.2 | 28.5 | x | x |
| 6-2 | 1.65 | 0.01 | 2.20 | 0.01 | 6.9 | 55.3 | 51.2 | 29.2 | Δ | ○ |
| 6-3 | 1.70 | 0.01 | 2.22 | 0.02 | 6.8 | 55.3 | 51.1 | 29.9 | ○ | ○ |
| 6-4 | 1.92 | 0.03 | 2.33 | 0.03 | 6.6 | 55.3 | 50.8 | 30.6 | ○ | ○ |
| 6-5 | 2.15 | 0.06 | 2.44 | 0.07 | 6.3 | 55.0 | 50.4 | 31.4 | ○ | ○ |
| 6-6 | 2.26 | 0.11 | 2.49 | 0.11 | 5.9 | 54.5 | 49.8 | 32.1 | ○ | x |

TABLE 7-1

| Sample No. | Material for first interface layer 405 (mol %) | Respective elements in terms of atom % | Material for second interface layer 403 (mol %) | Respective elements in terms of atom % |
|---|---|---|---|---|
| 7-1 | $(Al_2O_3)_{70}(Cr_2O_3)_{30}$ | $Al_{28.0}Cr_{12.0}O_{60.0}$ | $(Nb_2O_5)_{70}(Cr_2O_3)_{30}$ | $Nb_{21.9}Cr_{9.4}O_{68.7}$ |
| 7-2 | $(Al_2O_3)_{70}(Cr_2O_3)_{30}$ | $Al_{28.0}Cr_{12.0}O_{60.0}$ | $(Y_2O_3)_{70}(Cr_2O_3)_{30}$ | $Y_{28.0}Cr_{12.0}O_{60.0}$ |
| 7-3 | $(Al_2O_3)_{70}(Cr_2O_3)_{30}$ | $Al_{28.0}Cr_{12.0}O_{60.0}$ | $(Dy_2O_3)_{70}(Cr_2O_3)_{30}$ | $Dy_{28.0}Cr_{12.0}O_{60.0}$ |

TABLE 7-2

| Sample No. | First interface layer 405 Refractive index | First interface layer 405 Extinction coefficient | Second interface layer 403 Refractive index | Second interface layer 403 Extinction coefficient | Reflectance ratio $R_{c3}/R_{a3}$ | Transmittance $T_{c3}$ (%) | CNR (dB) | Erasure rate (−dB) | Moisture resistance | Comprehensive evaluation |
|---|---|---|---|---|---|---|---|---|---|---|
| 7-1 | 1.97 | 0.03 | 2.57 | 0.04 | 6.6 | 55.2 | 50.8 | 32.1 | ○ | ○ |
| 7-2 | 1.97 | 0.03 | 2.17 | 0.03 | 6.6 | 55.4 | 50.8 | 31.5 | ○ | ○ |
| 7-3 | 1.97 | 0.03 | 2.24 | 0.03 | 6.6 | 55.4 | 50.8 | 30.8 | ○ | ○ |

As a result, Samples 1-1, 2-1, 3-1, 4-1, 5-1 and 6-1 as comparative examples in which $Nb_2O_5$, $Y_2O_3$, $Dy_2O_3$, $Al_2O_3$, $TiO_2$, $Al_6Si_2O_{13}$ and $Al_2TiO_5$ were used for the first interface layer 405 and the second interface layer 403 and $Cr_2O_3$ was not contained therein showed a low extinction coefficient of about 0.01. In these samples, the reflectance ratio $R_{c3}/R_{a3}$ of the third information layer 13 was as high as 6 or more and the CNR was as good as 50 dB or more. However, the moisture resistance was low, and thus the comprehensive evaluation also was x. Samples 1-6, 2-6, 3-6, 4-6, 5-6 and 6-6 as comparative examples in which a material containing 60 mol % of $Cr_2O_3$ was used for the first interface layer 405 and the second interface layer 403 showed good moisture resistance. However, the extinction coefficient was as high as 0.1 or more, the reflectance ratio $R_{c3}/R_{a3}$ of the third information layer 13 was as low as 6 or less, and the CNR was as poor as less than 50 dB. Thus, the comprehensive evaluation also was x. Samples 1-2 to 1-5, 2-2 to 2-5, 3-2 to 3-5, 4-2 to 4-5, 5-2 to 5-5 and 6-2 to 6-5 as the examples of the present invention in which a material containing 5 mol % to 50 mol % of $Cr_2O_3$ was used for the first interface layer 405 and the second interface layer 403 showed a low extinction coefficient of less than 0.1. In these samples, the reflectance ratio $R_{c3}/R_{a3}$ was as high as 6 or more, the CNR was as good as 50 dB or more, and the moisture resistance was good. Thus, the comprehensive evaluation also was ○. These results showed that the amount of $Cr_2O_3$ to be contained in the first interface layer 405 and the second interface layer 403 should be not more than 50 mol %.

Further, in Samples 6-2 to 6-5, the refractive index (n1) of the first interface layer 405 was lower than the refractive index (n2) of the second interface layer 403, which allows the reflectance ratio $R_{c3}/R_{a3}$ of the third information layer 13 to be high, resulting in an improvement in the CNR. Similarly, also in Samples 7-1 to 7-3, it was possible to increase the reflectance ratio $R_{c3}/R_{a3}$ of the third information layer 13 more than in Samples 1-4, 2-4, 3-4, 4-4 and 5-4 that have the same content of $Cr_2O_3$, thus resulting in an improvement in the CNR. These results showed that the refractive index (n1) of the first interface layer 405 was preferably lower than the refractive index (n2) of the second interface layer 403.

It should be noted that, when the same experiments as described above were conducted on the first interface layer 205 and the second interface layer 203 of the first information layer 11, and the first interface layer 305 and the second interface layer 303 of the second information layer 12, the same results as those of the third information layer 13 were obtained.

Example 2

In Example 2, the information recording medium 19 of FIG. 3 was produced, and the relations of the material of each of the first interface layer 805 and the second interface layer 803 of the fourth information layer 18, the refractive index and the extinction coefficient of each of the first interface layer 805 and the second interface layer 803, the reflectance ratio $R_{c4}/R_{a4}$ of the fourth information layer 18, the transmittance $T_{c4}$ of the fourth information layer 18, the CNR of the fourth information layer 18, the erasure rate of the fourth information layer 18 and the moisture resistance of the fourth information layer 18 were investigated. Specifically, Samples 8-1 to 8-11 of the information recording medium 19 including the fourth information layer 18 in which the materials of the first interface layer 805 and the second interface layer 803 were different from the others were produced. Then the refractive index and the extinction coefficient of each of the first interface layer 805 and the second interface layer 803, the reflectance ratio $R_{c4}/R_{a4}$ of the fourth information layer 18, the transmittance $T_{c4}$ of the fourth information layer 18, the CNR of the fourth information layer 18, the erasure rate of the fourth information layer 18 and the moisture resistance of the fourth information layer 18 were determined for each sample.

Each sample was produced as follows. First, a polycarbonate substrate (with a diameter of 120 mm and a thickness of 1.1 mm) formed with guide grooves (with a depth of 20 nm and a track pitch of 0.32 μm) for guiding the laser beam 1 was prepared as the substrate 8. Then, the first information layer 15 was stacked on the polycarbonate substrate. An Ag—Pd—Cu layer (with a thickness of 100 nm) to serve as the reflective layer 508, an $(SiO_2)_{25}(In_2O_3)_{50}(ZrO_2)_{25}$ layer (with a thickness of 10 nm) to serve as the first dielectric layer 506, a $(Cr_2O_3)_{50}(ZrO_2)_{50}$ layer (with a thickness of 5 nm) to serve as the first interface layer 505, an $Sb_{77}Te_{15}Ge_8$ layer (with a thickness of 12 nm) to serve as the recording layer 504, a $(Cr_2O_3)_{50}(ZrO_2)_{50}$ layer (with a thickness of 5 nm) to serve as the second interface layer 503 and a $(ZnS)_{80}(SiO_2)_{20}$ layer (with a thickness of 45 nm) to serve as the second dielectric layer 502 were sequentially stacked by sputtering.

The film forming apparatus for sputtering the above-mentioned layers was provided respectively with an Ag—Pd—Cu alloy sputtering target to form the reflective layer 508, an $(SiO_2)_{25}(In_2O_3)_{50}(ZrO_2)_{25}$ sputtering target to form the first dielectric layer 506, a $(Cr_2O_3)_{50}(ZrO_2)_{50}$ sputtering target to form the first interface layer 505, an Sb—Te—Ge alloy sputtering target to form the recording layer 504, a $(Cr_2O_3)_{50}(ZrO_2)_{50}$ sputtering target to form the second interface layer 503 and a $(ZnS)_{80}(SiO_2)_{20}$ sputtering target to form the second dielectric layer 502. All the sputtering targets had a diameter of 200 mm and a thickness of 6 mm in form.

The reflective layer 508 was formed in an Ar gas atmosphere at a pressure of 0.2 Pa, using a DC power source with an input power of 2000 W. The first dielectric layer 506 was formed in an Ar gas atmosphere at a pressure of 0.13 Pa, using an RF power source with an input power of 2000 W. The first interface layer 505 was formed in an Ar gas atmosphere at a pressure of 0.13 Pa, using an RF power source with an input power of 3000 W. The recording layer 504 was formed in an Ar gas atmosphere at a pressure of 0.13 Pa, using a pulsed DC power source with an input power of 200 W. The second interface layer 503 was formed in an Ar gas atmosphere at a pressure of 0.13 Pa, using an RF power source with an input power of 3000 W. The second dielectric layer 502 was formed in an Ar gas atmosphere at a pressure of 0.13 Pa, using an RF power source with an input power of 2500 W.

Next, an ultraviolet curable acrylic resin was applied onto the second dielectric layer 502, and a substrate formed with guide grooves (with a depth of 20 nm and a track pitch of 0.32 μm) was placed on it and brought into close contact therewith. Then, it was rotated, thereby allowing a uniform resin layer to be formed. After curing the resin, the substrate was separated therefrom. As a result, the interlayer 6 with a thickness of 10 μm on the surface of which guide grooves for guiding the laser beam 1 were formed on the side of the second information layer 16 was obtained.

Thereafter, the second information layer 16 was stacked on the interlayer 6. A $TiO_2$ layer (with a thickness of 20 nm) to serve as the transmittance adjusting layer 609, an Ag—Pd—Cu layer (with a thickness of 8 nm) to serve as the reflective layer 608, a $(Cr_2O_3)_{40}(Al_2O_3)_{60}$ layer (with a thickness of 10 nm) to serve as the first interface layer 605, a $Ge_{45}Sb_4Te_{51}$ layer (with a thickness of 6 nm) to serve as the recording layer 604, a $(Cr_2O_3)_{40}(Al_2O_3)_{60}$ layer (with a thickness of 5 nm) to serve as the second interface layer 603 and a $(ZnS)_{80}(SiO_2)_{20}$ layer (with a thickness of 45 nm) to serve as the second dielectric layer 602 were sequentially stacked by sputtering.

The film forming apparatus for sputtering the above-mentioned layers was provided respectively with a $TiO_2$ sputtering target to form the transmittance adjusting layer 609, an Ag—Pd—Cu alloy sputtering target to form the reflective layer 608, a $(Cr_2O_3)_{40}(Al_2O_3)_{60}$ sputtering target to form the first interface layer 605, a Ge—Sb—Te alloy sputtering target to form the recording layer 604, a $(Cr_2O_3)_{40}(Al_2O_3)_{60}$ sputtering target to form the second interface layer 603 and a $(ZnS)_{80}(SiO_2)_{20}$ sputtering target to form the second dielectric layer 602. All the sputtering targets had a diameter of 200 mm and a thickness of 6 mm in form.

The transmittance adjusting layer 609 was formed in an atmosphere of a mixed gas of Ar and $O_2$ (3% $O_2$ gas with respect to the whole) at a pressure of 0.13 Pa, using a pulsed DC power source with an input power of 2000 W. The reflective layer 608 was formed in an Ar gas atmosphere at a pressure of 0.2 Pa, using a DC power source with an input power of 200 W. The first interface layer 605 was formed in an Ar gas atmosphere at a pressure of 0.13 Pa, using an RF power source with an input power of 3000 W. The recording layer 604 was formed in an Ar gas atmosphere at a pressure of 0.13 Pa, using a pulsed DC power source with an input power of 200 W. The second interface layer 603 was formed in an Ar gas atmosphere at a pressure of 0.13 Pa, using an RF power source with an input power of 3000 W. The second dielectric layer 602 was formed in an Ar gas atmosphere at a pressure of 0.13 Pa, using an RF power source with an input power of 2500 W.

Next, an ultraviolet curable acrylic resin was applied onto the second dielectric layer 602, and a substrate formed with guide grooves (with a depth of 20 nm and a track pitch of 0.32 µm) was placed on it and brought into close contact therewith. Then, it was rotated, thereby allowing a uniform resin layer to be formed. After curing the resin, the substrate was separated therefrom. As a result, the interlayer 5 with a thickness of 20 µm on the surface of which guide grooves for guiding the laser beam 1 were formed on the side of the third information layer 17 was obtained.

Thereafter, the third information layer 17 was stacked on the interlayer 5. A $(TiO_2)_{60} (Bi_2O_3)_{40}$ layer (with a thickness of 20 nm) to serve as the transmittance adjusting layer 709, an Ag—Pd—Cu layer (with a thickness of 7 nm) to serve as the reflective layer 708, a $(Cr_2O_3)_{40} (Al_2O_3)_{60}$ layer (with a thickness of 10 nm) to serve as the first interface layer 705, an $Sb_{86}Ge_{14}$ layer (with a thickness of 5 nm) to serve as the recording layer 704, a $(Cr_2O_3)_{40} (Al_2O_3)_{60}$ layer (with a thickness of 5 nm) to serve as the second interface layer 703 and a $(ZnS)_{80} (SiO_2)_{20}$ layer (with a thickness of 40 nm) to serve as the second dielectric layer 702 were sequentially stacked by sputtering.

The film forming apparatus for sputtering the above-mentioned layers was provided respectively with a $(TiO_2)_{60} (Bi_2O_3)_{40}$ sputtering target to form the transmittance adjusting layer 709, an Ag—Pd—Cu alloy sputtering target to form the reflective layer 708, a $(Cr_2O_3)_{40} (Al_2O_3)_{60}$ sputtering target to form the first interface layer 705, an Sb—Ge alloy sputtering target to form the recording layer 704, an $(SiO_2)_{25} (Cr_2O_3)_{50} (ZrO_2)_{25}$ sputtering target to form the second interface layer 703 and a $(ZnS)_{80} (SiO_2)_{20}$ sputtering target to form the second dielectric layer 702. All the sputtering targets had a diameter of 200 mm and a thickness of 6 mm in form.

The transmittance adjusting layer 709 was formed in an atmosphere of a mixed gas of Ar and $O_2$ (1% $O_2$ gas with respect to the whole) at a pressure of 0.13 Pa, using an RF power source with an input power of 2000 W. The reflective layer 708 was formed in an Ar gas atmosphere at a pressure of 0.2 Pa, using a DC power source with an input power of 200 W. The first interface layer 705 was formed in an Ar gas atmosphere at a pressure of 0.13 Pa, using an RF power source with an input power of 3000 W. The recording layer 704 was formed in an Ar gas atmosphere at a pressure of 0.13 Pa, using a pulsed DC power source with an input power of 200 W. The second interface layer 703 was formed in an Ar gas atmosphere at a pressure of 0.13 Pa, using an RF power source with an input power of 3000 W. The second dielectric layer 702 was formed in an Ar gas atmosphere at a pressure of 0.13 Pa, using an RF power source with an input power of 2500 W.

Next, an ultraviolet curable acrylic resin was applied onto the second dielectric layer 702, and a substrate formed with guide grooves (with a depth of 20 nm and a track pitch of 0.32 µm) was placed on it and brought into close contact therewith. Then, it was rotated, thereby allowing a uniform resin layer to be formed. After curing the resin, the substrate was separated therefrom. As a result, the interlayer 3 with a thickness of 15 µm on the surface of which guide grooves for guiding the laser beam 1 were formed on the side of the fourth information layer 18 was obtained.

Thereafter, the fourth information layer 18 was stacked on the interlayer 3. A $(TiO_2)_{60} (Bi_2O_3)_{40}$ layer (with a thickness of 15 nm) to serve as the transmittance adjusting layer 809, an Ag—Pd—Cu layer (with a thickness of 6 nm) to serve as the reflective layer 808, an $Al_2O_3$ layer (with a thickness of 6 nm) to serve as the first dielectric layer 806, the first interface layer 805 (with a thickness of 5 nm), a $Ge_{45}In_1Bi_3Te_{51}$ layer (with a thickness of 4.5 nm) to serve as the recording layer 804, the second interface layer 803 (with a thickness of 5 nm) and a $(ZnS)_{80} (SiO_2)_{20}$ layer (with a thickness of 35 nm) to serve as the second dielectric layer 802 were sequentially stacked by sputtering.

The film forming apparatus for sputtering the above-mentioned layers was provided respectively with a $(TiO_2)_{60} (Bi_2O_3)_{40}$ sputtering target to form the transmittance adjusting layer 809, an Ag—Pd—Cu alloy sputtering target to form the reflective layer 808, an $Al_2O_3$ sputtering target to form the first dielectric layer 806, a sputtering target to form the first interface layer 805, a Ge—In—Bi—Te alloy sputtering target to form the recording layer 804, a sputtering target to form the second interface layer 803 and a $(ZnS)_{80} (SiO_2)_{20}$ sputtering target to form the second dielectric layer 802. All the sputtering targets had a diameter of 200 mm and a thickness of 6 mm in form.

The transmittance adjusting layer 809 was formed in an atmosphere of a mixed gas of Ar and $O_2$ (1% $O_2$ gas with respect to the whole) at a pressure of 0.13 Pa, using an RF power source with an input power of 2000 W. The reflective layer 808 was formed in an Ar gas atmosphere at a pressure of 0.2 Pa, using a DC power source with an input power of 200 W. The first dielectric layer 806 was formed in an Ar gas atmosphere at a pressure of 0.13 Pa, using an RF power source with an input power of 2000 W. The first interface layer 805 was formed in an Ar gas atmosphere at a pressure of 0.13 Pa, using an RF power source with an input power of 3000 W. The recording layer 804 was formed in an Ar gas atmosphere at a pressure of 0.13 Pa, using a pulsed DC power source with an input power of 200 W. The second interface layer 803 was formed in an Ar gas atmosphere at a pressure of 0.13 Pa, using an RF power source with an input power of 3000 W. The second dielectric layer 802 was formed in an Ar gas atmosphere at a pressure of 0.13 Pa, using an RF power source with an input power of 2500 W.

Finally, an ultraviolet curable acrylic resin was applied onto the second dielectric layer 802, which was rotated, so that a uniform resin layer was formed. Then, the resin was cured by irradiation with ultraviolet rays. Thus, the transparent layer 2 with a thickness of 55 µm was formed. Thereafter, an initialization process was performed to crystallize the recording layer 504, the recording layer 604, the recording layer 704 and the recording layer 804 with a laser beam. As described above, a plurality of samples in each of which the materials of the first interface layer 805 and the second interface layer 803 were different from the others were produced.

The refractive index and the extinction coefficient of each of the first interface layer 805 and the second interface layer 803 were measured in the same manner as in Example 1.

For each sample thus obtained, the reflectance of the first information layer 15, the second information layer 16, the third information layer 17 and the fourth information layer 18 of the information recording medium 19 was measured using the recording/reproducing apparatus 34 of FIG. 4. At this time, the wavelength of the laser beam 1 was set to 405 nm, the numerical aperture NA of the objective lens 30 was set to 0.85, the linear velocity of the sample in the measurement was set to 7.4 m/s, and the reproducing power was set to 1.0 mW. Further, the reflectance was measured on the grooves.

The transmittance ($T_{c4}$) of the fourth information layer 18 was obtained by calculation of ($R_{c3}=R_{c0} \times T_{c4} \times T_{c4}$) from the reflectance ($R_{c0}$) that had been measured in advance for the sample in which only the third information layer 17 was formed and the reflectance ($R_{c3}$) of the third information layer 17 of each of Samples 8-1 to 8-11.

Further, the length of recording marks was set to 0.168 μm (3T) and 0.446 μm (8T) in the measurement of the CNR and the erasure rate of the fourth information layer 18.

Further, the moisture resistance of the fourth information layer 18 was determined by conducting an accelerated test on the produced samples under conditions of a temperature of 85° C. and a relative humidity of 85% RH and observing the state after the test using an optical microscope.

For each sample, Table 8-1 shows the material of the first interface layer 805 and the material of the second interface layer 803. Further, for each sample, Table 8-2 shows the refractive index and the extinction coefficient of the first interface layer 805, the refractive index and the extinction coefficient of the second interface layer 803, the reflectance ratio $R_{c4}/R_{a4}$ of the fourth information layer 18, the transmittance $T_{c4}$ of the fourth information layer 18, the CNR of the fourth information layer 18, the erasure rate of the fourth information layer 18 and the moisture resistance of the fourth information layer 18. With regard to the moisture resistance, the cases where no corrosion/separation occurred after 200-hour acceleration were evaluated as ○, the cases where corrosion/separation occurred after 200-hour acceleration though did not occur after 100-hour acceleration were evaluated as Δ, and the cases where corrosion/separation occurred after 100-hour acceleration were evaluated as x, under conditions of a temperature of 85° C. and a relative humidity of 85% RH. With regard to the comprehensive evaluation, the cases where all the conditions of the transmittance of at least 50%, the CNR of at least 50 dB, and the moisture resistance of Δ or ○ were satisfied was evaluated as ○, and the cases where any one of the conditions of the transmittance of less than 50%, the CNR of less than 50 dB, and the moisture resistance of x was satisfied was evaluated as x.

TABLE 8-1

| Sample No. | Material for first interface layer 805 (mol %) | Respective elements in terms of atom % | Material for second interface layer 803 (mol %) | Respective elements in terms of atom % |
|---|---|---|---|---|
| 8-1 | $(SiO_2)_5(Al_2O_3)_{65}(Cr_2O_3)_{30}$ | $Si_{1.0}Al_{26.5}Cr_{12.2}O_{60.3}$ | $(TiO_2)_5(Al_2O_3)_{65}(Cr_2O_3)_{30}$ | $Ti_{1.0}Al_{26.5}Cr_{12.2}O_{60.3}$ |
| 8-2 | $(SiO_2)_{20}(Al_2O_3)_{50}(Cr_2O_3)_{30}$ | $Si_{4.3}Al_{21.7}Cr_{13.0}O_{61.0}$ | $(TiO_2)_{20}(Al_2O_3)_{50}(Cr_2O_3)_{30}$ | $Ti_{4.3}Al_{21.7}Cr_{13.0}O_{61.0}$ |
| 8-3 | $(SiO_2)_{35}(Al_2O_3)_{35}(Cr_2O_3)_{30}$ | $Si_{8.1}Al_{16.3}Cr_{14.0}O_{61.6}$ | $(TiO_2)_{35}(Al_2O_3)_{35}(Cr_2O_3)_{30}$ | $Ti_{8.1}Al_{16.3}Cr_{14.0}O_{61.6}$ |
| 8-4 | $(Nb_2O_5)_{35}(Al_2O_3)_{35}(Cr_2O_3)_{30}$ | $Nb_{12.3}Al_{12.3}Cr_{10.5}O_{64.9}$ | $(Nb_2O_5)_{35}(Al_2O_3)_{35}(Cr_2O_3)_{30}$ | $Nb_{12.3}Al_{12.3}Cr_{10.5}O_{64.9}$ |
| 8-5 | $(Y_2O_3)_{35}(Al_2O_3)_{35}(Cr_2O_3)_{30}$ | $Y_{14.0}Al_{14.0}Cr_{12.0}O_{60.0}$ | $(Nb_2O_5)_{35}(Y_2O_3)_{35}(Cr_2O_3)_{30}$ | $Nb_{12.3}Y_{12.3}Cr_{10.5}O_{64.9}$ |
| 8-6 | $(Dy_2O_3)_{35}(Al_2O_3)_{35}(Cr_2O_3)_{30}$ | $Dy_{14.0}Al_{14.0}Cr_{12.0}O_{60.0}$ | $(Nb_2O_5)_{35}(Dy_2O_3)_{35}(Cr_2O_3)_{30}$ | $Nb_{12.3}Dy_{12.3}Cr_{10.5}O_{64.9}$ |
| 8-7 | $(Al_2O_3)_{35}(ZrO_2)_{35}(Cr_2O_3)_{30}$ | $Al_{15.1}Zr_{8.1}Cr_{15.1}O_{61.7}$ | $(Nb_2O_5)_{35}(Al_2O_3)_{35}(Cr_2O_3)_{30}$ | $Nb_{12.3}Al_{12.3}Cr_{10.5}O_{64.9}$ |
| 8-8 | $(Al_2O_3)_{35}(HfO_2)_{35}(Cr_2O_3)_{30}$ | $Al_{15.1}Hf_{8.1}Cr_{15.1}O_{61.7}$ | $(Nb_2O_5)_{35}(Al_2O_3)_{35}(Cr_2O_3)_{30}$ | $Nb_{12.3}Al_{12.3}Cr_{10.5}O_{64.9}$ |
| 8-9 | $(Al_2O_3)_{70}(Cr_2O_3)_{20}(Ga_2O_3)_{10}$ | $Al_{28.0}Cr_{8.0}Ga_{4.0}O_{60.0}$ | $(Nb_2O_5)_{35}(Al_2O_3)_{35}(Cr_2O_3)_{20}(Ga_2O_3)_{10}$ | $Nb_{12.3}Al_{12.3}Cr_{7.0}Ga_{3.5}O_{64.9}$ |
| 8-10 | $(Al_2O_3)_{70}(Cr_2O_3)_{20}(In_2O_3)_{10}$ | $Al_{28.0}Cr_{8.0}In_{4.0}O_{60.0}$ | $(Nb_2O_5)_{35}(Al_2O_3)_{35}(Cr_2O_3)_{20}(In_2O_3)_{10}$ | $Nb_{12.3}Al_{12.3}Cr_{7.0}In_{3.5}O_{64.9}$ |
| 8-11 | $(Al_2O_3)_{70}(Cr_2O_3)_{20}(Ga_2O_3)_5(In_2O_3)_5$ | $Al_{28.0}Cr_{8.0}Ga_{2.0}In_{2.0}O_{60.0}$ | $(Nb_2O_5)_{35}(Al_2O_3)_{35}(Cr_2O_3)_{20}(In_2O_3)_{10}$ | $Nb_{12.3}Al_{12.3}Cr_{7.0}In_{3.5}O_{64.9}$ |

TABLE 8-2

| Sample No. | First interface layer 805 Refractive index | First interface layer 805 Extinction coefficient | Second interface layer 803 Refractive index | Second interface layer 803 Extinction coefficient | Reflectance ratio $R_{c4}/R_{a4}$ | Transmittance $T_{c4}$ (%) | CNR (dB) | Erasure rate (-dB) | Moisture resistance | Comprehensive evaluation |
|---|---|---|---|---|---|---|---|---|---|---|
| 8-1 | 1.96 | 0.02 | 2.02 | 0.03 | 7.1 | 60.1 | 50.1 | 31.2 | ○ | ○ |
| 8-2 | 1.94 | 0.02 | 2.18 | 0.03 | 7.7 | 60.2 | 50.8 | 31.5 | ○ | ○ |
| 8-3 | 1.91 | 0.02 | 2.33 | 0.03 | 8.3 | 60.3 | 51.5 | 31.3 | ○ | ○ |
| 8-4 | 2.27 | 0.03 | 2.27 | 0.03 | 7.4 | 60.7 | 50.4 | 31.1 | ○ | ○ |
| 8-5 | 2.07 | 0.03 | 2.37 | 0.03 | 8.0 | 60.5 | 51.1 | 30.8 | ○ | ○ |
| 8-6 | 2.11 | 0.03 | 2.40 | 0.03 | 8.4 | 60.5 | 51.5 | 30.2 | ○ | ○ |
| 8-7 | 2.17 | 0.03 | 2.27 | 0.03 | 7.2 | 60.6 | 50.2 | 31.5 | ○ | ○ |
| 8-8 | 2.16 | 0.03 | 2.27 | 0.03 | 7.3 | 60.6 | 50.3 | 31.3 | ○ | ○ |
| 8-9 | 1.90 | 0.01 | 2.19 | 0.01 | 7.4 | 60.5 | 50.4 | 29.4 | ○ | ○ |
| 8-10 | 1.91 | 0.02 | 2.21 | 0.02 | 7.3 | 60.4 | 50.3 | 29.7 | ○ | ○ |
| 8-11 | 1.91 | 0.01 | 2.21 | 0.02 | 7.3 | 60.4 | 50.3 | 29.5 | ○ | ○ |

As a result, Samples 8-1 to 8-8 in which the first interface layer 805 contained about 30 mol % of $Cr_2O_3$ and the rest was a mixture selected from $Nb_2O_5$, $Y_2O_3$, $Dy_2O_3$, $TiO_2$, $SiO_2$, $Al_2O_3$, $ZrO_2$ and $HfO_2$, and the second interface layer 803 contained about 30 mol % of $Cr_2O_3$ and the rest was a mixture selected from $Nb_2O_5$, $Y_2O_3$, $Dy_2O_3$, $TiO_2$, $SiO_2$ and $Al_2O_3$ showed a low extinction coefficient of 0.03 or less. In these samples, the reflectance ratio $R_{c4}/R_{a4}$ was as high as 7 or more, the CNR was as good as 50 dB or more, and the moisture resistance was good. Thus, the comprehensive evaluation also was ○. Further, Samples 8-9 to 8-11 in which $Cr_2O_3$ was partially substituted by $Ga_2O_3$ and/or $In_2O_3$ also showed a low extinction coefficient of 0.03 or less. In these samples, the reflectance ratio $R_{c4}/R_{a4}$ was as high as 7 or more, the CNR was as good as 50 dB, and the moisture resistance was good. Thus, the comprehensive evaluation also was ○.

From the above results, it has been found to be preferable that the first interface layer 805 contain 50 mol % or less of $Cr_2O_3$ and at least one oxide selected from $Nb_2O_5$, $Y_2O_3$, $Dy_2O_3$, $TiO_2$, $SiO_2$, $Al_2O_3$, $ZrO_2$ and $HfO_2$, and the second interface layer 803 contain 50 mol % or less of $Cr_2O_3$ and at least one oxide selected from $Nb_2O_5$, $Y_2O_3$, $Dy_2O_3$, $TiO_2$, $SiO_2$ and $Al_2O_3$. Further, it also has been found that $Cr_2O_3$ may be partially substituted by $Ga_2O_3$ and/or $In_2O_3$.

It should be noted that, when the same experiments as described above were conducted on the first interface layer 505 and the second interface layer 503 of the first information layer 15, the first interface layer 605 and the second interface layer 603 of the second information layer 16, and the first interface layer 705 and the second interface layer 703 of the third information layer 17, the same results as those of the fourth information layer 18 were obtained.

INDUSTRIAL APPLICABILITY

The information recording medium of the present invention can achieve a high-capacity optical information recording medium using an excellent dielectric material for layers that are provided in contact with the recording layer, and thus is useful for rewritable multilayer discs, e.g., Blu-ray Disc Rewritable (BD-RE), write-once multilayer discs, e.g., Blu-ray Disc Recordable (BD-R), or the like.

Further, the information recording medium of the present invention is useful also for next generation rewritable information recording media or next generation rewritable multilayer information recording media that allow recording/reproduction to be performed using an optical system with NA>1, for example, an optical system using SIL or SIM, as a high-capacity optical information recording medium having excellent dielectric layers.

The invention claimed is:

1. An information recording medium with respect to which information can be recorded or reproduced by irradiation with an optical beam, the information recording medium comprising:
a second interface layer;
a recording layer; and
a first interface layer, in this order from the optical beam incident side, wherein the first interface layer and the second interface layer are disposed in contact with the recording layer,
the second interface layer contains M1 (where M1 is at least one element selected from Nb, Y, Dy, Ti, Si and Al), Cr and oxygen (O),
the first interface layer contains M2 (where M2 is at least one element selected from Nb, Y, Dy, Ti, Si, Al, Zr and Hf), Cr and oxygen (O)
the first interface layer and the second interface layer each contain Cr in a range of 50 mol % or less in terms of an oxide ($Cr_2O_3$), and
when a refractive index of the first interface layer with respect to the optical beam is denoted as n1 and a refractive index of the second interface layer with respect to the optical beam is denoted as n2, a relationship of n1<n2 is satisfied.

2. The information recording medium according to claim 1, wherein
the second interface layer contains a material expressed by the following formula (1):

$$M1_a Cr_b O_{100-a-b} (atom\%) \quad (1),$$

(where a and b satisfy $12<a<40$, $0<b\leq25$, and $25<(a+b)\leq40$).

3. The information recording medium according to claim 1, wherein the first interface layer contains a material expressed by the following formula (2):

$$M2_c Cr_d O_{100-c-d} (atom\%) \quad (2),$$

(where c and d satisfy $12<c<40$, $0<d\leq25$, and $25<(c+d)\leq40$).

4. The information recording medium according to claim 1, wherein
the second interface layer contains a material composed of D1 (where D1 is at least one oxide selected from $Nb_2O_5$, $Y_2O_3$, $Dy_2O_3$, $TiO_2$, $SiO_2$ and $Al_2O_3$), $Cr_2O_3$, and
the material is expressed by the following formula (3):

$$(D1)_e (Cr_2O_3)_{100-e} (mol\%) \quad (3),$$

(where e satisfies $50\leq e<100$).

5. The information recording medium according to claim 1, wherein
the first interface layer contains a material composed of D2 (where D2 is at least one oxide selected from $Nb_2O_5$, $Y_2O_3$, $Dy_2O_3$, $TiO_2$, $SiO_2$, $Al_2O_3$, $ZrO_2$ and $HfO_2$), $Cr_2O_3$, and
the material is expressed by the following formula (4):

$$(D2)_f (Cr_2O_3)_{100-f} (mol\%) \quad (4),$$

(where f satisfies $50\leq f<100$).

6. The information recording medium according to claim 1, wherein
Cr contained in at least one selected from the first interface layer and the second interface layer is partially substituted by at least one element selected from Ga and In.

7. The information recording medium according to claim 4, wherein
$Cr_2O_3$ contained in the second interface layer is partially substituted by at least one oxide selected from $Ga_2O_3$ and $In_2O_3$.

8. The information recording medium according to claim 5, wherein
$Cr_2O_3$ contained in the first interface layer is partially substituted by at least one oxide selected from $Ga_2O_3$ and $In_2O_3$.

9. The information recording medium according to claim 1, comprising
N information layers, where the N is an integer of at least two, wherein
the N information layers include an L-th information layer (where L is at least one integer that satisfies $1\leq L\leq N$) that includes the second interface layer, the recording layer and the first interface layer in this order from the optical beam incident side, when the N information layers are counted from the first information layer to the N-th information layer, sequentially from the opposite side of the optical beam incident side.

10. The information recording medium according to claim 9, wherein the N is 3.

11. The information recording medium according to claim 1, wherein
the recording layer is formed of a material in which a phase change occurs due to irradiation with the optical beam.

12. The information recording medium according to claim 1, wherein
the recording layer contains Ge—Te, and a content of Ge in the recording layer is 40 atom % or more.

13. The information recording medium according to claim 1, wherein
the recording layer contains at least one material selected from Sb—Ge and Sb—Te, and a content of Sb in the recording layer is 70 atom % or more.

14. The information recording medium according to claim 1, wherein
the first interface layer and the second interface layer each have an extinction coefficient of less than 0.1, with respect to an optical beam at a wavelength of 405 nm.

15. The information recording medium according to claim 1, wherein
the second interface layer consists essentially of M1, Cr and oxygen (O), or consists essentially of M1, Cr, oxygen (O) and at least one element selected from Ga and In, and
the first interface layer consists essentially of M2, Cr and oxygen (O) or consists essentially of M2, Cr, oxygen (O) and at least one element selected from Ga and In.

16. The information recording medium according to claim 15, wherein
the second interface layer consists of M1, Cr and oxygen (O), or consists of M1, Cr, oxygen (O) and at least one element selected from Ga and In and
the first interface layer consists of M2, Cr and oxygen (O) or consists of M2, Cr, oxygen (O) and at least one element selected from Ga and In.

17. The information recording medium according to claim 1, wherein the difference between the refractive index n1 of the first interface layer and the refractive index n2 of the second interface layer is within a range of 0.2 to 0.5.

* * * * *